US009902821B2

(12) United States Patent
Khan et al.

(10) Patent No.: US 9,902,821 B2
(45) Date of Patent: Feb. 27, 2018

(54) HIGH MELT FLOW PEAK COMPOSITIONS

(71) Applicant: SOLVAY SPECIALTY POLYMERS USA, LLC., Alpharetta, GA (US)

(72) Inventors: Ahmed Khan, Alpharetta, GA (US); Duane A. Fish, Cumming, GA (US); Mohammad Jamal El-Hibri, Atlanta, GA (US)

(73) Assignee: SOLVAY SPECIALTY POLYMERS USA, LLC., Alpharetta, GA (US)

( * ) Notice: Subject to any disclaimer, the term of this patent is extended or adjusted under 35 U.S.C. 154(b) by 271 days.

(21) Appl. No.: 14/425,342

(22) PCT Filed: Sep. 4, 2013

(86) PCT No.: PCT/EP2013/068241
§ 371 (c)(1),
(2) Date: Mar. 3, 2015

(87) PCT Pub. No.: WO2014/037374
PCT Pub. Date: Mar. 13, 2014

(65) Prior Publication Data
US 2015/0225522 A1 Aug. 13, 2015

Related U.S. Application Data

(60) Provisional application No. 61/696,528, filed on Sep. 4, 2012.

(30) Foreign Application Priority Data

Nov. 28, 2012 (EP) .................. 121945448

(51) Int. Cl.
C08J 5/18 (2006.01)
B29C 43/24 (2006.01)
B29C 47/00 (2006.01)
B29C 47/02 (2006.01)
H01B 13/14 (2006.01)
C09D 171/00 (2006.01)
C08L 71/00 (2006.01)
C08L 27/18 (2006.01)
B29K 27/18 (2006.01)
B29K 71/00 (2006.01)
B29K 81/00 (2006.01)
B29L 7/00 (2006.01)

(52) U.S. Cl.
CPC .............. C08J 5/18 (2013.01); B29C 43/24 (2013.01); B29C 47/0057 (2013.01); B29C 47/025 (2013.01); C08L 27/18 (2013.01); C08L 71/00 (2013.01); C09D 171/00 (2013.01); H01B 13/148 (2013.01); B29K 2027/18 (2013.01); B29K 2071/00 (2013.01); B29K 2081/06 (2013.01); B29K 2995/005 (2013.01); B29L 2007/008 (2013.01); C08G 2650/40 (2013.01); C08J 2327/18 (2013.01); C08J 2371/08 (2013.01); C08J 2381/06 (2013.01); Y10T 428/24355 (2015.01); Y10T 428/294 (2015.01)

(58) Field of Classification Search
CPC ................ C08J 4/18; C08J 5/18; B29C 43/24
USPC ...................... 528/389; 264/171.14
See application file for complete search history.

(56) References Cited

U.S. PATENT DOCUMENTS 5,131,827 A * 7/1992 Tasaka ............... C08K 7/02
264/275
6,013,719 A 1/2000 Lahijani

FOREIGN PATENT DOCUMENTS

| EP | 1454963 A1 | 9/2004 | |
|---|---|---|---|
| JP | 58160346 A | 9/1983 | |
| JP | 358160346 | * 9/1983 | ............... C08K 7/06 |
| JP | 09-157532 | * 6/1997 | ............ C08L 101/00 |
| JP | 09157532 A | 6/1997 | |

OTHER PUBLICATIONS

JP 09-157532 Jun. 1997 translation.*
JP358160346 Sep. 1983 Translation.*
Zhang et al. — Friction and wear variations of short carbon fiber (SCF)/PTFE/graphite (10 vol.%) filled PEEK: Effects of fiber orientation and nominal contact pressure (2010) wear, Elsevier sequoia, vol. 268, No. 7-8, pp. 893-899 — XP026924017.
Burris D. L. et al., "A low friction and ultra low wear rate PEEK/PTFE composite", Wear, Aug. 30, 2006 (Aug. 30, 2006), vol. 261, No. 3-4, pp. 410-418—Elsevier Sequoia, Lausanne, CH—XP027902692, ISSN: 0043-1648 [retrieved on Aug. 30, 2006].
Bijwe J. et al., "Influence of PTFE content in PEEK-PTFE blends on mechanical properties and tribo-performance in various wear modes", Wear, May 1, 2005 (May 1, 2005), vol. 258, No. 10, pp. 1536-1542—, Elsevier Sequoia, Lausanne, CH—XP027614408, ISSN: 0043-1648 [retrieved on May 1, 2005].

* cited by examiner

Primary Examiner — Terressa Boykin
(74) Attorney, Agent, or Firm — Jarrod N. Raphael; Dwight M. Benner III

(57) ABSTRACT

A composition [composition (C)] comprising at least one poly(aryl ether ketone) polymer having a melt flow rate (MFR) equal to or higher than 8 g/10 min at 400.degree. C. and under a load of 2.16 kg, [(PAEK$_{HMF}$) polymer], from 0.1 to 50 wt. % of at least one poly(tetrafluoroethylene) polymer having a D50 particle size equal to or below 10.mu.m, and having a melt viscosity equal to or lower than 1.times.10$^5$ Pas at 372.degree. C., from 0 to 50% wt. % of at least one poly(aryl ether sulfone) polymer having a melt flow of at least 15 g/10 min at 365 degree C. and under a load of 5.0 kg, [(PAES) polymer], from 0 to 50% wt. % of at least one reinforcing filler, with the proviso that—should the composition (C) comprise a (PAES) polymer having MFR of more than 22 g/10 min, then the (PTFE) polymer is present in an amount of less than 40 wt. %, and—should the composition (C) comprise a (PAES) polymer having MFR of 22 g/10 min or less, then the (PTFE) polymer is present in an amount of less than 30 wt. %, and wherein all % are based on the total weight of the composition (C).

17 Claims, No Drawings

HIGH MELT FLOW PEAK COMPOSITIONS

This application claims priority to U.S. provisional application No. 61/696,528 filed on 4 Sep. 2012 and to European application No. 12194544.8 filed on 28 Nov. 2012, the whole content of each of these applications being incorporated herein by reference for all purposes.

FIELD OF INVENTION

The present invention relates to high performance poly (aryletherketone) (PAEK)-based polymer compositions which are very useful for the manufacture of thin films and wire coatings and a process for the manufacturing of said compositions. The invention further relates to said PAEK-based thin films and wire coatings and a process for the manufacturing thereof.

BACKGROUND OF THE INVENTION

PAEK polymers, including in particular poly(etheretherketone) (PEEK), poly(etherketone) (PEK) and poly(etherketoneketone) (PEKK) polymers are well known for their exceptional balance of technical properties, namely high melting point, good thermal stability, high stiffness and strength, good toughness and especially excellent chemical resistance. Therefore, PAEK have potential for a wide variety of uses, and their favorable properties class them with the best of the engineering polymers. For example, PEEK polymers have found increasing use in the manufacturing of high temperature and fire resistant films since PEEK has good elongation and good flexibility in thin sections such as films, or for coating of wires since PEEK has good flame resistance, being self extinguishing with very low smoke.

It is also widely recognized that certain uses of PAEK polymers, in particular in thin films and in wire coatings, require the material also have enhanced electrical insulating properties and low tendency to arc track. However, PAEK polymers are rather susceptible to arc tracking.

Polytetrafluoroethylene (PTFE) polymers, while known for their thermal stability, high melting temperature, chemical inertness and lubricity (low coefficient of friction and non-stick character), excellent electrical insulation properties, very low dielectric constant and including a very low tendency to arc track when used in wire coatings, they are also known for their non-melt-fabricability, i.e. they cannot be fabricated by such usual melt-fabrication technique as melt extrusion, including injection molding. Instead, (PTFE) is processed by such non-melt flow techniques as paste extrusion (fine powder type of (PTFE)) and compression molding (granular type of (PTFE)) into strong articles, the strength of which can be augmented by sintering.

(PTFE) resins of lower molecular weight (typically, 50,000 to 700,000 as opposed to standard (PTFE), generally having mass exceeding 2,000,000) and having lower melt viscosity (MV) are known in the art.

While these (PTFE) are melt flowable, the much lower molecular weight deprives them of strength, whereby articles molded from this low MV (PTFE) by melt extrusion break upon handling. Thus, although melt flowable, the low MV (PTFE) is not melt fabricable.

The use of low MV (PTFE) with non-fluorinated thermally stable polymers such as PAEK polymers has already been discussed in the prior art.

For example, U.S. Pat. No. 6,013,719 discloses PAEK/ (PTFE) compositions which have the utility of being melt fabricable into improved articles. In particular, blends of PEKK with certain low MV (PTFE) polymers, more precisely with ZONYL® MP 1600 (PTFE) powder having a MFR 17 g/10 min at 372° C., a melting peak temperature of 325° C. measured according to ASTM D4894 and a particle size distribution of about 12 μm measured by Laser Microtrac, has been described in the examples.

JP-A 58-160,346 discloses a PAEK/(PTFE) resin composition which has outstanding sliding characteristics and comprises a thermoplastic aromatic polyetherketone such as PEEK, as a base material, 10 to 40% by weight of polytetrafluoroethylene which has a mean particle size of less than 20 μm as a fluorocarbon polymer and 10 to 40% by weight of a carbon fiber. It is stated that a high heat distortion temperature (HDT) and a high limiting PV value are obtained by the above resin composition. The thermoplastic aromatic poly(ether ketone) can have an intrinsic viscosity (IV) of between 0.7 and 2.6 (dL/g), measured at 25° C. on a solution of 0.1 g of polymer in 100 ml $H_2SO_4$ with a density of 1.84 $g/cm^3$.

U.S. Pat. No. 5,131,827 discloses a PEEK/(PTFE) composition suitable for scroll compressor parts containing 60 parts by weight of PEEK, 30 parts by weight of a SiC whisker, 10 parts by weight of carbon fiber, 7 parts by weight of (PTFE), in particular Fluon® L150 J (PTFE), said (PTFE) having a average particle diameter of 9 μm, and 3 parts by weight of Boron Nitride (BN).

EP 1 454 963 A1 discloses the synthesis of a low-molecular weight (PTFE) which is characterized by a number averaged particle size of 5 μm, a melt viscosity of $2.0 \times 10^5$ poises ($2.0 \times 10^4$ Pa·s) measured at 380° C. and a melting point of 327° C. Resin compositions containing PEEK (Victrex PEEK 450G) and 0.025 and 0.005% mass of said low-molecular weight (PTFE), relative to the total mass of PEEK and (PTFE), are exemplified in examples 8 and 9. Said PEEK/(PTFE) resins are for use as a molding material.

However, there is still a shortfall in the art for PAEK/ (PTFE) compositions especially suitable for the manufacture of thin PAEK-based films and wire coatings, thus possessing low tendency to arc track and very low dielectric constant thereby providing enhanced electrical insulation properties, but also possessing a combination of high performance properties including high temperature performance, mechanical strength, chemical resistance, high friction and wear resistance, good flame resistance, low smoke and moreover offering superior processability/flow capabilities, especially offering an improved melt and coating extrusion. There is thus still a high need for thin PAEK-based films having a reduced tendency to tearing and/or forming holes during melt manufacturing and/or having improved surface appearance (e.g. having a lower amount of surface defects) and/or having an increased smoothness. There is also still a high need for thin PAEK-based wire coatings, having a reduced tendency to tearing and/or surface fracturing during coating extrusion.

SUMMARY OF INVENTION

The Applicant has now found surprisingly that it is possible to provide PAEK/PTFE compositions advantageously fulfilling the above mentioned needs, including enhanced electrical insulation properties and improved melt processability suitable for excellent melt and coating extrusion.

The invention thus pertains to a composition [composition (C)] comprising:

from 0.1 to 99.9% by weight (wt. %) of at least one poly(aryl ether ketone) polymer having a melt flow rate (MFR) equal to or higher than 8 g/10 min at 400° C. and under a load of 2.16 kg, as measured in accordance with ASTM method D1238 [($PAEK_{HMF}$) polymer, herein after], from 0.1 to 50 wt. % of at least one poly(tetrafluoroethylene) polymer having a D50 particle size equal to or below 10 μm, and having a melt viscosity equal to or lower than $1\times10^5$ Pa·s at 372° C. measured according to a modified ASTM D-1238-52T method [(PTFE) polymer, herein after], from 0 to 50 wt. % of at least one poly(aryl ether sulfone) polymer having a melt flow of at least 15 g/10 min at 365° C. and under a load of 5.0 kg, as measured in accordance with ASTM method D1238 [(PAES) polymer, herein after], from 0 to 50% wt. % of at least one reinforcing filler, and with the proviso that:

should the composition (C) comprise a (PAES) polymer having a melt flow of more than 22 g/10 min, when measured in accordance with ASTM method D1238 at 365° C. and under a load of 5.0 kg, then the (PTFE) polymer is present in an amount of less than 40 wt. %, and should the composition (C) comprise a (PAES) polymer having a melt flow of 22 g/10 min or less, when measured in accordance with ASTM method D1238 at 365° C. and under a load of 5.0 kg, then the (PTFE) polymer is present in an amount of less than 30 wt. %, and wherein all % are based on the total weight of the composition (C).

In the rest of the text, the expression "($PAEK_{HMF}$) polymer" is understood, for the purposes of the present invention, both in the plural and the singular, that is to say that the inventive composition may comprise one or more than one ($PAEK_{HMF}$) polymer. It is understood that the same applies for the expressions "(PAES) polymer", "(PTFE) polymer" and the "reinforcing filler".

Poly(Aryl Ether Ketone) Polymer

For the purpose of the invention, the expressions "poly (aryl ether ketone) polymer having a melt flow rate (MFR) equal to or higher than 8 g/10 min at 400° C. and under a load of 2.16 kg, as measured in accordance with ASTM method D1238" and "($PAEK_{HMF}$) polymer" are intended to denote any polymer, comprising recurring units, more than 50% moles of said recurring units are recurring units ($R_{PAEK\_HMF}$) comprising a Ar—C(O)—Ar' group, with Ar and Ar', equal to or different from each other, being aromatic groups. The recurring units ($R_{PAEK\_HMF}$) are generally selected from the group consisting of formulae (J-A) to (J-O), herein below:

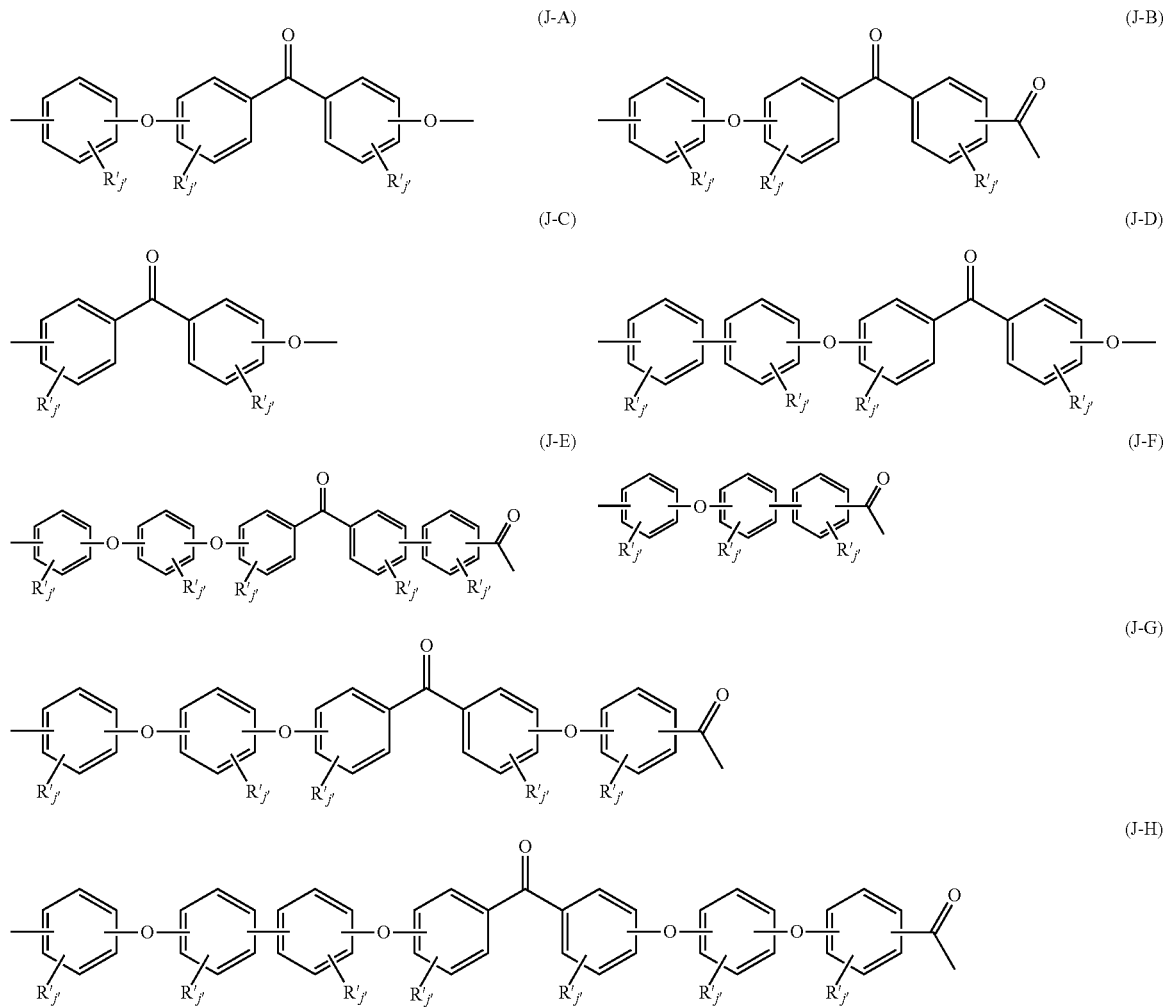

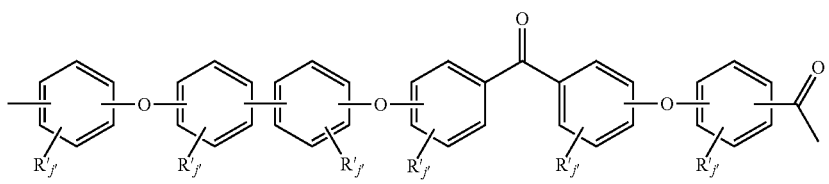
(J-I)

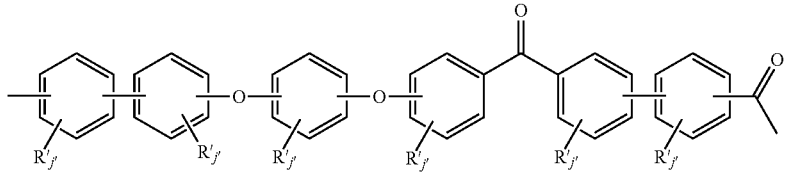
(J-J)

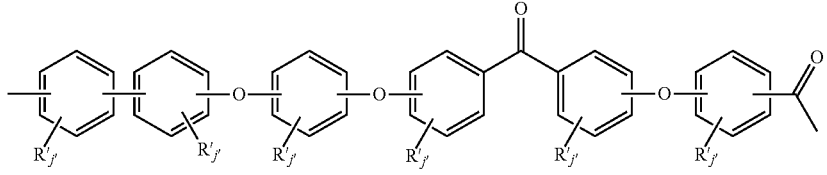
(J-K)

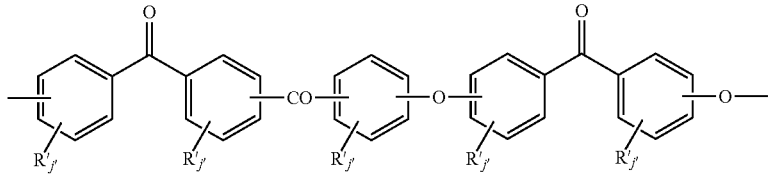
(J-L)

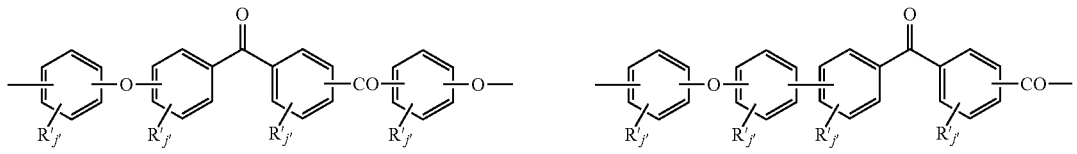
(J-M) (J-N)

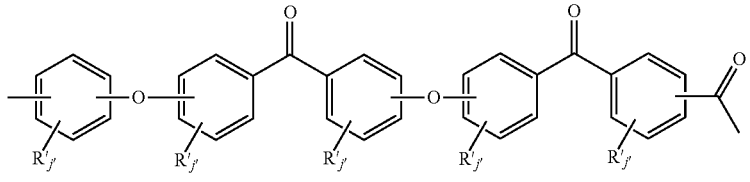
(J-O)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
j' is zero or is an integer from 0 to 4.

In recurring unit ($R_{PAEK\_HMF}$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage.

Still, in recurring units ($R_{PAEK\_HMF}$), j' is preferably at each occurrence zero, that is to say that the phenylene moieties have no other substituents than those enabling linkage in the main chain of the polymer.

Preferred recurring units ($R_{PAEK\_HMF}$) are thus selected from those of formulae (J'-A) to (J'-O) herein below:

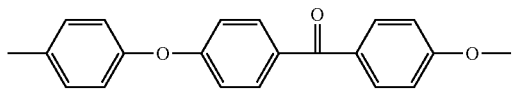
(J'-A)

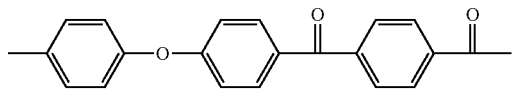
(J'-B)

-continued

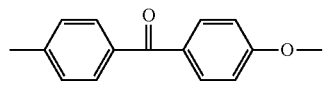
(J'-C)

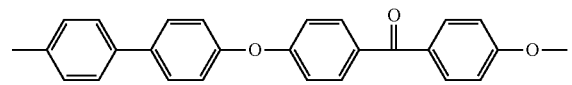
(J'-D)

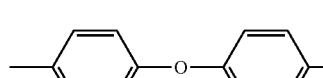

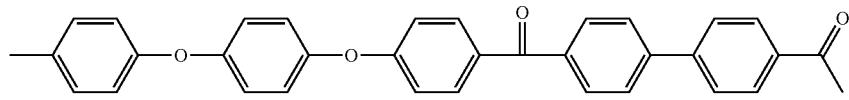
(J'-E)

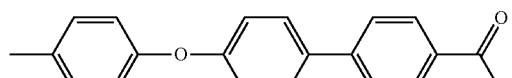
(J'-F)

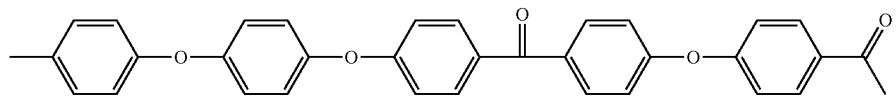
(J'-G)

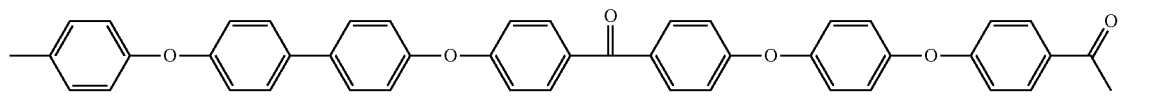
(J'-H)

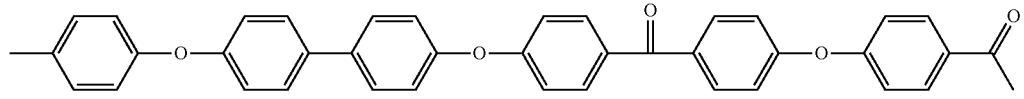
(J'-I)

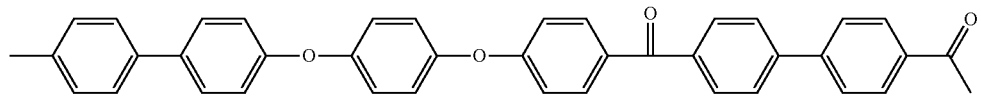
(J'-J)

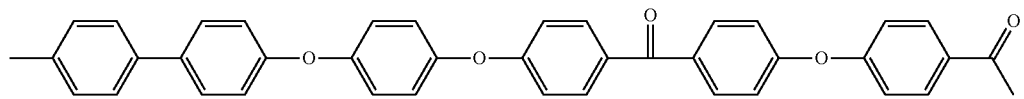
(J'-K)

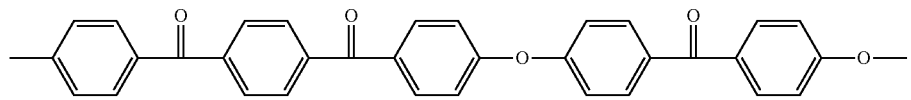
(J'-L)

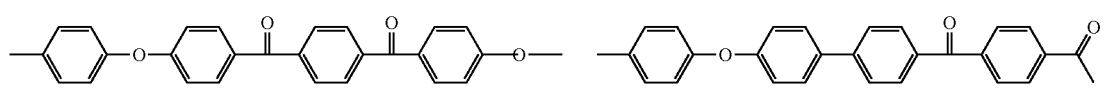
(J'-M)

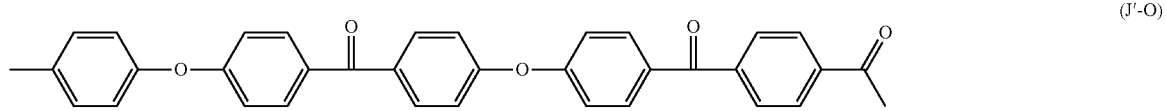
(J'-N)

(J'-O)

Still more preferably, ($R_{PAEK\_HMF}$) are chosen from:

(J'-A)

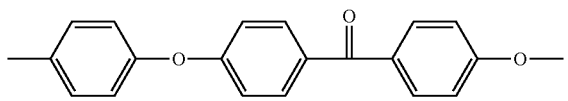

(J'-B)

-continued (J'-C)

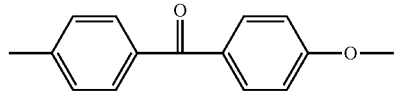

In the ($PAEK_{HMF}$) polymer, as detailed above, preferably more than 60 wt. %, more preferably more than 80 wt. %, still more preferably more than 90 wt. % of the recurring units are recurring units ($R_{PAEK\_HMF}$), as above detailed.

Still, it is generally preferred that substantially all recurring units of the ($PAEK_{HMF}$) polymer are recurring units ($R_{PAEK\_HMF}$), as detailed above; chain defects, or very minor amounts of other units might be present, being understood that these latter do not substantially modify the properties of ($R_{PAEK\_HMF}$).

The ($PAEK_{HMF}$) polymer may be notably a homopolymer, a random, alternate or block copolymer. When the ($PAEK_{HMF}$) polymer is a copolymer, it may notably contain (i) recurring units ($R_{PAEK\_HMF}$) of at least two different formulae chosen from formulae (J-A) to (J-O), or (ii) recurring units ($R_{PAEK\_HMF}$) of one or more formulae (J-A) to (J-O) and recurring units ($R^*_{PAEK\_HMF}$) different from recurring units ($R_{PAEK\_HMF}$).

As will be detailed later on, the ($PAEK_{HMF}$) polymer may be a polyetheretherketones polymer [($PEEK_{HMF}$) polymers, herein after]. Alternatively, the ($PAEK_{HMF}$) polymer may be a polyetherketoneketone polymer [($PEKK_{HMF}$) polymer, herein after], polyetherketone polymer [($PEK_{HMF}$) polymer, hereinafter] or a polyetheretherketone-polyetherketoneketone polymer [($PEEK_{HMF}$-$PEK_{HMF}$) polymer, herein after].

The ($PAEK_{HMF}$) polymer may also be a blend composed of at least two different ($PAEK_{HMF}$) polymers chosen from the group consisting of ($PEKK_{HMF}$) polymers, ($PEEK_{HMF}$) polymers, ($PEK_{HMF}$) polymers and ($PEEK_{HMF}$-$PEK_{HMF}$) polymers, as above detailed.

For the purpose of the present invention, the term "($PEEK_{HMF}$) polymer" is intended to denote any polymer of which more than 50 wt. % of the recurring units are recurring units ($R_{PAEK\_HMF}$) of formula J'-A.

Preferably more than 75 wt. %, preferably more than 85 wt. %, preferably more than 95 wt. %, preferably more than 99 wt. % of the recurring units of the ($PEEK_{HMF}$) polymer are recurring units of formula J'-A. Most preferably all the recurring units of the ($PEEK_{HMF}$) polymer are recurring units of formula J'-A.

For the purpose of the present invention, the term "($PEKK_{HMF}$) polymer" is intended to denote any polymer of which more than 50 wt. % of the recurring units are recurring units ($R_{PAEK\_HMF}$) of formula J'-B.

Preferably more than 75 wt. %, preferably more than 85 wt. %, preferably more than 95 wt. %, preferably more than 99 wt. % of the recurring units of the ($PEKK_{HMF}$) polymer are recurring units of formula J'-B. Most preferably all the recurring units of the ($PEKK_{HMF}$) polymer are recurring units of formula J'-B.

For the purpose of the present invention, the term "($PEK_{HMF}$) polymer" is intended to denote any polymer of which more than 50 wt. % of the recurring units are recurring units ($R_{PAEK\_HMF}$) of formula J'-C.

Preferably more than 75 wt. %, preferably more than 85 wt. %, preferably more than 95 wt. %, preferably more than 99 wt. % of the recurring units of the ($PEK_{HMF}$) polymer are recurring units of formula J'-C. Most preferably all the recurring units of the ($PEK_{HMF}$) polymer are recurring units of formula J'-C.

Excellent results were obtained when the ($PAEK_{HMF}$) polymer was a ($PEEK_{HMF}$) homopolymer, i.e. a polymer of which substantially all the recurring units of the ($PEEK_{HMF}$) polymer are recurring units of formula J'-A, chain defects, or very minor amounts of other units might be present, being understood that these latter do not substantially modify the properties of the ($PEEK_{HMF}$) homopolymer.

The Applicant has surprisingly found that only the appropriate selection of the ($PAEK_{HMF}$) polymer provides for superior processability/flow capabilities, especially offering an improved melt and coating extrusion, as evidenced, notably, by the manufacturing of successful un-torn, visible homogenous thin films and wire coatings.

It is essential that the ($PAEK_{HMF}$) polymer has a melt flow rate (MFR) equal to or higher than 8 g/10 min at 400° C. and under a load of 2.16 kg, as measured in accordance with ASTM method D1238, preferably MFR is equal to or higher than 15 g/10 min, preferably MFR is equal to or higher than 20 g/10 min, more preferably MFR is equal to or higher than 30 g/10 min, even more preferably MFR is equal to or higher than 34 g/10 min, most preferably MFR is equal to or higher than 38 g/10 min.

The melt flow rate (MFR) of the ($PAEK_{HMF}$) polymer at 400° C. and under a load of 2.16 kg, as measured in accordance with ASTM method D1238, is generally of at most 120 g/10 min, preferably of at most 80 g/10 min, preferably of at most 60 g/10 min, more preferably of at most 55 g/10 min, and still more preferably of at most 45 g/10 min.

Good results have been obtained with ($PAEK_{HMF}$) polymers having a melt flow rate (MFR) at 400° C. and under a load of 2.16 kg, as measured in accordance with ASTM method D1238 from 30 g/10 min to 55 g/10 min.

Excellent results have been obtained with ($PAEK_{HMF}$) polymers having a melt flow rate (MFR) at 400° C. and under a load of 2.16 kg, as measured in accordance with ASTM method D1238 from 38 g/10 min to 45 g/10 min.

In general a Tinius Olsen Extrusion Plastometer melt flow test apparatus can be used to measure said melt flow rate.

The ($PAEK_{HMF}$) polymer can have a reduced viscosity (RV) of at least 0.50 dl/g, preferably at least 0.65 dl/g, more preferably at least 0.70 dl/g, even more preferably at least 0.80 dl/g as measured in 95-98% sulfuric acid (d=1.84 g/ml) at a ($PAEK_{HMF}$) polymer concentration of 1 g/100 ml.

The RV of the ($PAEK_{HMF}$) polymer can notably be equal to or less than 1.20 dl/g preferably equal to or less than 1.10 dl/g, more preferably equal to or less than 1.00 dug, more preferably equal to or less than 0.90 dl/g, most preferably equal to or less than 0.85 dl/g, as measured in 95-98% sulfuric acid (d=1.84 g/ml) at a ($PAEK_{HMF}$) polymer concentration of 1 g/100 ml.

Good results have been obtained with ($PAEK_{HMF}$) polymers having a RV from 0.70 dl/g to 0.90 dl/g, as measured in 95-98% sulfuric acid (d=1.84 g/ml) at a ($PAEK_{HMF}$) polymer concentration of 1 g/100 ml. Excellent results have been obtained with ($PAEK_{HMF}$) polymers having a RV from 0.80 dl/g to 0.85 dl/g, as measured in 95-98% sulfuric acid (d=1.84 g/ml) at a $PAEK_{HMF}$ polymer concentration of 1 g/100 ml.

The measurement is generally performed using a No 50 Cannon-Fleske viscometer; RV is measured at 25° C. in a time less than 4 hours after dissolution.

The ($PAEK_{HMF}$) polymer can have a intrinsic viscosity (IV) of at least 0.50 dl/g, preferably at least 0.60 dl/g, more preferably at least 0.70 dl/g, as measured in 95-98% sulfuric acid (d=1.84 g/ml) at a ($PAEK_{HMF}$) polymer concentration of 0.1 g/100 ml.

The IV of the ($PAEK_{HMF}$) polymer can notably be equal to or less than 1.10 dl/g, preferably equal to or less than 0.90 dl/g, more preferably equal to or less than 0.85 dl/g, most preferably equal to or less than 0.80 dl/g, as measured in 95-98% sulfuric acid (d=1.84 g/ml) at a ($PAEK_{HMF}$) polymer concentration of 0.1 g/100 ml.

Good results have been obtained with ($PAEK_{HMF}$) polymers having an IV from 0.70 dl/g to 0.80 dl/g, as measured in 95-98% sulfuric acid (d=1.84 g/ml) at a ($PAEK_{HMF}$) polymer concentration of 0.1 g/100 ml.

The measurement is generally performed using a No. 50 Cannon-Fleske viscometer; IV is measured at 25° C. in a time less than 4 hours after dissolution.

The (PAEK$_{HMF}$) polymer has a melt viscosity of advantageously at least 0.05 kPa·s, preferably at least 0.08 kPa·s, more preferably at least 0.1 kPa·s, still more preferably at least 0.15 kPa·s at 400° C. and a shear rate of 1000 s$^{-1}$, as measured using a capillary rheometer in accordance with ASTM D3835

As capillary rheometer, a Kayeness Galaxy V Rheometer (Model 8052 DM) can be used.

The (PAEK$_{HMF}$) polymer has a melt viscosity of advantageously at most 0.35 kPa·s, preferably at most 0.40 kPa·s, more preferably at most 0.42 kPa·s at 400° C. and a shear rate of 1000 s$^{-1}$, as measured using a capillary rheometer in accordance with ASTM D3835.

Non limitative examples of commercially available (PAEK) polymers suitable for the invention include the KETASPIRE® polyetheretherketone commercially available from Solvay Specialty Polymers USA, LLC.

The (PAEK$_{HMF}$) polymer can be prepared by any method known in the art for the manufacture of poly(aryl ether ketone)s.

One well known in the art process to produce poly(aryl ether ketone)s, in particular PEEK homopolymers, comprises the step of reacting a usually substantially equimolar mixture of at least one bisphenol with at least one dihalobenzoid compound, and/or at least one halophenol compound (nucleophilic polycondensation reaction), as described in Canadian Pat. No. 847,963 and U.S. Pat. No. 4,176,222, the whole content of both being herein incorporated by reference. A preferred bisphenol in such a process is hydroquinone; preferred dihalobenzoid compounds in such a process are 4,4'-difluorobenzophenone, 4,4'-dichlorobenzophenone and 4-chloro-4'-fluorobenzophenone; preferred halophenols compounds in such a process are 4-(4-chlorobenzoyl)phenol and 4-(4-fluorobenzoyl)phenol.

Another well known in the art process to produce PEEK homopolymers comprises the step of electrophilically polymerizing phenoxyphenoxybenzoic acid or the like, using an alkane sulfonic acid as solvent and in the presence of a condensing agent, as the process described in U.S. Pat. No. 6,566,484, the whole content of which is herein incorporated by reference. Other poly(aryl ether ketone)s may be produced by the same method, starting from other monomers than phenoxyphenoxybenzoic acid, such as those described in U.S. Pat. Appl. 2003/0130476, the whole content of which is also herein incorporated by reference.

Polyetheretherketone homopolymers are commercially available notably from Solvay Specialty Polymers, L.L.C. as KETASPIRE® and GATONE® poly(aryl ether ketone)s.

The weight percent of the (PAEK$_{HMF}$) polymer in the composition (C) is generally of at least 10 wt. %, preferably of at least 20 wt. %, more preferably of at least 30 wt. %, more preferably of at least 40 wt. %, more preferably of at least 45 wt. %, based on the total weight of the composition (C).

It is further understood that the weight percent of the polymer (PAEK$_{HMF}$) in the composition (C) will generally be of at most 99.9 wt. %, preferably of at most 95 wt. %, more preferably of at most 90 wt. %, more preferably of at most 85 wt. %, more preferably of at most 80 wt. %, more preferably of at most 75 wt. %, more preferably of at most 70 wt. %, based on the total weight of the composition (C).

In the absence of the (PAES) polymer, excellent results were obtained when the composition (C) comprised the (PAEK$_{HMF}$) polymer in an amount of 40-90 wt. % based on the total weight of the composition (C).

In the presence of the (PAES) polymer, excellent results were obtained when the composition (C) comprised the (PAEK$_{HMF}$) polymer in an amount of 40-70 wt. % based on the total weight of the composition (C).

Poly(tetrafluoroethylene) Polymer

As said, composition (C) comprises at least one poly(tetrafluoroethylene) polymer having a D50 particle size equal to or below 10 μm and having a melt viscosity (MV) equal to or lower than $1 \times 10^5$ Pa·s at 372° C. measured according to a modified ASTM D-1238-52T method, being modified as notably described in U.S. Pat. No. 4,380,618, the whole contents of which is herein incorporated by reference [(PTFE) polymer].

The Applicant has surprisingly found that combining the (PTFE) polymers of the present invention with the (PAEK$_{HMF}$) polymers, as mentioned above, enables providing compositions possessing enhanced processability and excellent insulating properties, whereby said compositions provide homogeneous thin films and wire coatings exhibiting smoother surfaces and increased strength.

The (PTFE) polymers according to the present invention generally are polymers of tetrafluoroethylene. Within the scope of the present invention, it is understood, however, that the (PTFE) polymers may also comprise minor amounts of one or more co-monomers such as hexafluoropropylene, perfluoro(methyl vinyl ether), perfluoro(propyl vinyl ether), perfluoro-(2,2-dimethyl-1,3-dioxole), and the like, provided, however that the latter do not significantly adversely affect the unique properties, such as thermal and chemical stability of the tetrafluoroethylene homopolymer. Preferably, the amount of such co-monomer does not exceed about 3 mole percent (herein "mol %"), and more preferably less than about 1 mol %; particularly preferred is a co-monomer content of less than 0.5 mol %. In the case that the overall co-monomer content is greater than 0.5 mol %, it is preferred that amount of the a perfluoro(alkyl vinylether) co-monomer is less than about 0.5 mol %. Most preferred are tetrafluoroethylene homopolymers.

The Applicant has found that the D50 particle size of the (PTFE) polymer of the composition (C) is of great importance.

As said, the D50 particle size of the (PTFE) polymer of the composition (C) is advantageously equal to or below 10 μm, preferably equal to or below 8 μm, more preferably equal to or below 6 μm. The D50 particle size value of the (PTFE) polymer of the composition (C) is preferably equal to or at least 0.05 μm, equal to or at least 0.1 μm, more preferably equal to or at least 0.2 μm, equal to or at least 1 μm, more preferably equal to or at least 2 μm, most preferably equal to or at least 3 μm. The D50 particle size value of the (PTFE) polymer of the composition (C) is advantageously from 2 μm to 8 μm, preferably from 3 μm to 6 μm.

A D50 particle size value of the (PTFE) polymer of the composition (C) of 4 μm gave particularly good results.

For the purpose of the present invention, the D50 value of the particle size means a particle size, such as 50 weight percent of the relevant material have a larger particle size and 50 weight percent have a smaller particle size.

The D50 value of the particle size of the (PTFE) polymer is measured via light scattering techniques (dynamic or laser) using the respective equipment coming for example from the company Malvern (Mastersizer Micro or 3000) or using screen analysis according to DIN 53196.

The (PTFE) polymer of the present invention has advantageously a melt viscosity (MV) from 50 to $1 \times 10^5$ Pa·s at 372° C. measured according to a modified ASTM D-1238-52T method, as described above, preferably MV of (PTFE)

polymer is from 100 to 1×10⁴ Pa·s at 372° C. in accordance with the procedure of a modified ASTM D-1238-52T method, as described above.

The (PTFE) polymer of the present invention is in general characterized by a melt flow rate (MFR) at 372° C. and under a load of 10 kg, as measured in accordance with ASTM method D1238, from about 0.10 g/10 min to about 200 g/10 min.

In a specific embodiment of the present invention, the melt flow rate (MFR) of the (PTFE) polymer is measured at 325° C. and under a load of 225 g, as measured in accordance with ASTM method D1238, and the MFR in general can vary from about 0.10 g/10 min to about 200 g/10 min.

For the purpose of the present invention, it is the second melting temperature of said (PTFE) polymer which can be measured according to a modified ASTM D 3418 method, as specified below. It is understood that the melting point recorded at the second heating period is hereby referred to as the melting point of the (PTFE) polymer of the present invention ($T_{mII}$).

The (PTFE) polymer of the present invention has advantageously a melting temperature ($T_{mII}$) equal to or below 330° C.

The (PTFE) polymer of the composition (C) is a low molecular weight polymer, that is to say a polymer having a number averaged molecular weight (Mn) advantageously equal to or below 700000, preferably equal to or below 200000, preferably equal to or below 100000, preferably equal to or below 90000, more preferably equal to or below 50 000, more preferably equal to or below 20000.

The (PTFE) polymers of the present invention can be synthesized according to any standard chemical methods for the polymerization of tetrafluoroethylene as described in detail in the literature, such as notably by W. H. Tuminello et al., Macromolecules, Vol. 21, pp. 2606-2610 (1988); notably in Kirk-Othmer, The Encyclopaedia of Chemical Technology, 4 th Ed., pub. by John Wiley and Sons (1994) on pp 637-639 of Vol. 11, notably in US 2011/0218311 A1 and as practiced in the art. These publications notably describe the low molecular weight PTFE polymers as being obtained by polymerization or by controlled degradation of common, high molecular weight PTFE homopolymers or low co-monomer content copolymers thereof, for example by controlled thermal decomposition, electron beam, gamma- or other radiation, and the like. Said low molecular weight PTFE polymers are often described in the art as PTFE micropowders.

The weight percent of the (PTFE) polymer in the composition (C) is generally of at least 0.1 wt. %, preferably of at least 1 wt. %, preferably of at least 2 wt. %, preferably of at least 5 wt. %, preferably of at least 8 wt. %, based on the total weight of the composition (C).

Should the composition (C) not comprise a (PAES) polymer, good results were obtained when the composition (C) comprised the (PTFE) polymer in an amount from 10 to 50 wt. %, based on the total weight of the composition (C).

Should the composition (C) not comprise a (PAES) polymer, said composition (C) wherein the (PTFE) polymer is present in an amount of at most 30 wt. % has been found particularly advantageous for manufacturing not only films but also wire coatings with no tearing nor surface fracturing.

Should the composition (C) comprise a (PAES) polymer having a melt flow of more than 22 g/10 min, when measured in accordance with ASTM method D1238 at 365° C. and under a load of 5.0 kg, good results were obtained when the composition (C) comprised the (PTFE) polymer in an amount of advantageously less than 38 wt. %, preferably less than 35 wt. %, based on the total weight of the composition (C); even better results were obtained, according to this embodiment, when the composition (C) comprised the (PTFE) polymer in an amount of from 10 to 30 wt. %, based on the total weight of the composition (C).

Should the composition (C) comprise a (PAES) polymer having a melt flow of 22 g/10 min or less, when measured in accordance with ASTM method D1238 at 365° C. and under a load of 5.0 kg, good results were obtained when the composition (C) comprised the (PTFE) polymer in an amount of advantageously less than 28 wt. %, preferably less than 25 wt. %, based on the total weight of the composition (C); even better results were obtained, according to this embodiment, when the composition (C) comprised the (PTFE) polymer in an amount of from 10 to 20 wt. %, based on the total weight of the composition (C).

Poly(aryl ether sulfone) (PAES) Polymer

The composition (C) may optionally comprise at least one poly(aryl ether sulfone) polymer [(PAES) polymer] having a melt flow of at least 15 g/10 min at 365° C. and under a load of 5.0 kg, as measured in accordance with ASTM method D1238.

For the purpose of the present invention, the expressions "poly(aryl ether sulfone) polymer" and "(PAES) polymer" are intended to denote any polymer of which more than 50 wt. % of the recurring units are recurring units (R) of one or more formulae containing at least one arylene group, at least one ether group (—O—) and at least one sulfone group [—S(═O)₂—].

In the (PAES) polymer as above detailed preferably more than 60%, more preferably more than 80%, still more preferably more than 90% moles of the recurring units are recurring units (R), as above detailed.

Still, it is generally preferred that substantially all recurring units of (PAES) polymer are recurring units (R), as above detailed; chain defects, or very minor amounts of other units might be present, being understood that these latter do not substantially modify the properties of (PAES) polymer.

The arylene group of the (PAES) polymer may be aromatic radicals comprising from 6 to 36 carbon atoms, which is optionally substituted by at least one substituent selected from the group consisting of halogen, alkyl, alkenyl, alkynyl, aryl, arylalkyl, nitro, cyano, alkoxy, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium.

The recurring units (R) are advantageously recurring units of formula (A) as shown below:

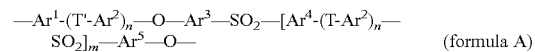
(formula A)

wherein:
Ar¹, Ar², Ar³, Ar⁴, and Ar⁵, equal to or different from each other and at each occurrence, are independently an aromatic mono- or polynuclear group;

T and T', equal to or different from each other and at each occurrence, is independently a bond or a divalent group optionally comprising one or more than one heteroatom;

n and m, equal to or different from each other, are independently zero or an integer of 1 to 5;

Preferably, Ar¹, Ar², Ar³, Ar⁴, Ar⁵ are equal or different from each other and are aromatic moieties preferably selected from the group consisting of those complying with following formulae:

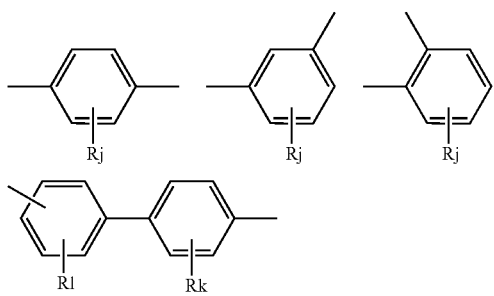

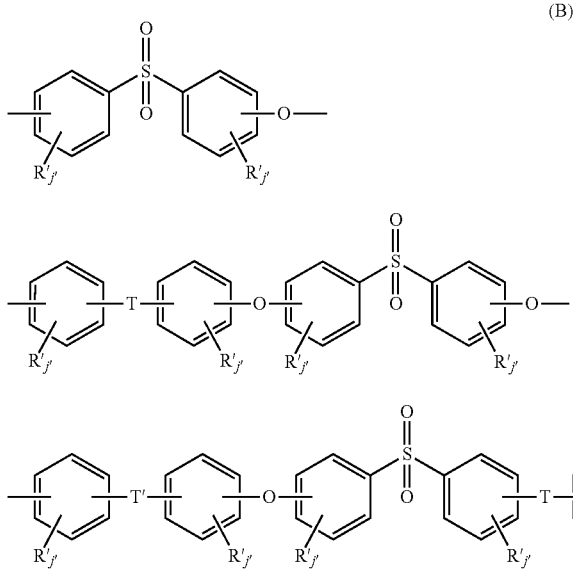

(B)

(C)

(D)

(E)

-continued

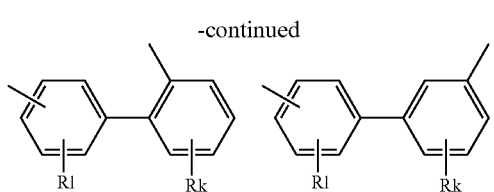

wherein R is selected from the group consisting of:

hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and j, k and l equal or different from each other, are independently 0, 1, 2, 3 or 4.

$Ar^2$ may further be selected from the group consisting of fused benzenic rings such as naphthylenes (and in particular 2,6-naphthylene), anthrylenes (and in particular 2,6-anthrylene) and phenanthrylenes (and in particular 2,7-phenanthrylene), naphthacenylenes and pyrenylenes groups; an aromatic carbocyclic system comprising from 5 to 24 atoms, at least one of which is a heteroatom, such as pyridines, benzimidazoles, quinolines, etc. The hetero atom is often chosen from B, N, O, Si, P and S. It is more often chosen from N, O and S.

Preferably, T and T', equal to or different from each other, is selected from the group consisting of a bond, $-CH_2-$; $-O-$; $-SO_2-$; $-S-$; $-C(O)-$; $-C(CH_3)_2-$; $-C(CF_3)_2-$; $-C(=CCl_2)-$; $-C(CH_3)(CH_2CH_2COOH)-$; $-N=N-$; $-R^aC=CR^b-$; where each $R^a$ and $R^b$; independently of one another, is a hydrogen or a $C_1$-$C_{12}$-alkyl, $C_1$-$C_{12}$-alkoxy, or $C_6$-$C_{18}$-aryl group; $-(CH_2)_n-$ and $-(CF_2)_n-$ with n=integer from 1 to 6, or an aliphatic divalent group, linear or branched, of up to 6 carbon atoms; and mixtures thereof.

Recurring units (R) can be notably selected from the group consisting of those of formulae (B) to (E) herein below:

wherein:

each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4;

T and T', equal to or different from each other, is selected from the group consisting of a bond, $-CH_2-$; $-O-$; $-SO_2-$; $-S-$; $-C(O)-$; $-C(CH_3)_2-$; $-C(CF_3)_2-$; $-C(=CCl_2)-$; $-C(CH_3)(CH_2CH_2COOH)-$; $-N=N-$; $-R^aC=CR^b-$; where each $R^a$ and $R^b$; independently of one another, is a hydrogen or a $C_1$-$C_{12}$-alkyl, $C_1$-$C_{12}$-alkoxy, or $C_6$-$C_{18}$-aryl group; $-(CH_2)_n-$ and $-(CF_2)_n-$ with n=integer from 1 to 6, or an aliphatic divalent group, linear or branched, of up to 6 carbon atoms; and mixtures thereof.

It is understood that the (PAES) polymer, as detailed above is different from the ($PAEK_{HMF}$) polymer, as detailed above.

As will be detailed later on, the (PAES) polymer may be a poly(biphenyl ether sulfone), such as a polyphenylsulfone which is especially preferred. Alternatively, the (PAES) polymer may be a polyethersulfone, a polyetherethersulfone or a bisphenol A polysulfone.

The (PAES) polymer may also be a blend composed of at least two poly(aryl ether sulfone)s chosen from a group consisting of a poly(biphenyl ether sulfone), a polyethersulfone, a polyetherethersulfone or a polysulfone.

For the purpose of the present invention, the poly(biphenyl ether sulfone) is intended to denote any polymer of which more than 50 wt. % of the recurring units are recurring units (Ra) of one or more formulae containing at least one ether group (—O—), at least one sulfone group [—S(=O)$_2$—] and at least two groups (G) chosen from phenylene, naphthylenes (such as 2,6-naphthylene), anthrylenes (such as 2,6-anthrylene) and phenanthrylenes (such as 2,7-phenanthrylene), naphthacenylenes and pyrenylenes, each of said groups (G) being joined to at least one group (G) different from itself, directly by at least one single bond and, optionally in addition, by at most one methylene group. Accordingly, groups (G) may thus be joined together to form notably biphenylene groups such as p-biphenylene, 1,2'-binaphthylene groups, triphenylene groups such as p-triphenylene and fluorenylene groups (i.e. divalent groups derived from fluorene).

The recurring units (Ra) are advantageously recurring units of formula (A), as defined above, with the proviso that at least one $Ar^1$ through $Ar^5$ is an aromatic moiety preferably selected from the group consisting of those complying with following formulae:

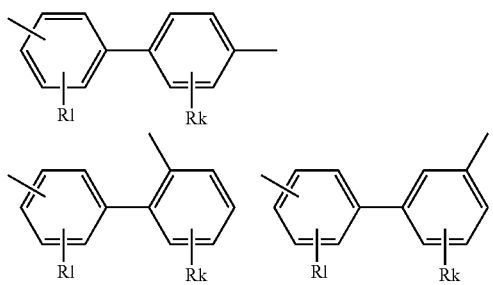

wherein R is selected from the group consisting of:
hydrogen, halogen, alkyl, alkenyl, alkynyl, aryl, ether, thio-ether, carboxylic acid, ester, amide, imide, alkali or alkaline earth metal sulfonate, alkyl sulfonate, alkali or alkaline earth metal phosphonate, alkyl phosphonate, amine and quaternary ammonium and k and l equal or different from each other, are independently 0, 1, 2, 3 or 4.

The definitions and preferences described above for T, T', $Ar^1$, $Ar^2$, $Ar^3$, $Ar^4$, $Ar^5$ n and m equally apply here.

More preferably, recurring units (Ra) are chosen from

For the purpose of the present invention, a polyphenylsulfone (PPSU) is intended to denote any polymer of which more than 50 wt. % of the recurring units are recurring units (Ra) of formula (F), while a polyphenylsulfone homopolymer is intended to denote any polymer of which all the recurring units are recurring units (Ra) of formula (F).

Preferably more than 75 wt. %, preferably more than 85 wt. %, preferably more than 95 wt. %, preferably more than 99 wt. % of the recurring units of the poly(biphenyl ether sulfone) are recurring units (Ra). Still more preferably, substantially all the recurring units of the poly(biphenyl ether sulfone) are recurring units (Ra), chain defects, or very minor amounts of other units might be present, being understood that these latter do not substantially modify the properties.

In a preferred embodiment of the present invention, more than 75 wt. % more preferably more than 90 wt. %, more preferably more than 99 wt. %, even more preferably substantially all the recurring units of the poly(biphenyl ether sulfone) are of formula (F), chain defects, or very minor amounts of other units might be present, being understood that these latter do not substantially modify the properties.

The polyphenylsulfone may be notably a homopolymer, or a copolymer such as a random or a block copolymer. When the polyphenylsulfone is a copolymer, its recurring units are advantageously a mix of recurring units (Ra) of formula (F) and of recurring units (Ra*), different from recurring units (Ra), such as recurring units of formula (K), (L) or (M) represented hereafter:

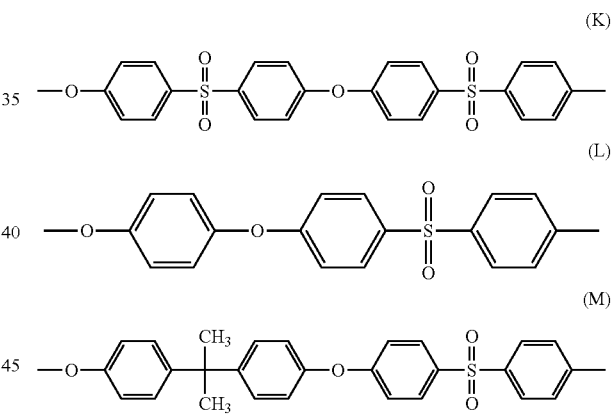

and mixtures thereof.

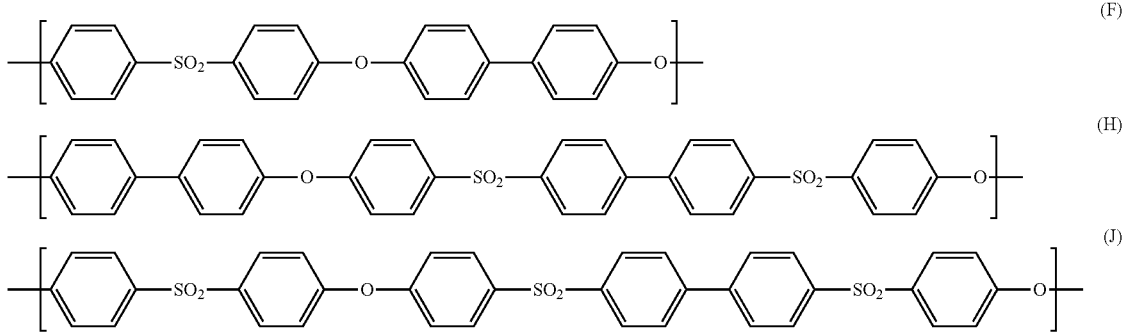

and mixtures thereof.

The polyphenylsulfone can also be a blend of the previously cited homopolymer and copolymer.

RADEL® R PPSU and DURADEX® D-3000 PPSU from Solvay Specialty Polymers USA, L.L.C. are examples of polyphenylsulfone homopolymers.

Poly(biphenyl ether sulfone)s can be prepared by known methods. Methods well known in the art are those described in U.S. Pat. Nos. 3,634,355; 4,008,203; 4,108,837 and 4,175,175, the whole contents of which is herein incorporated by reference.

For the purpose of the present invention, a polyethersulfone is intended to denote any polymer of which more than 50 wt. % of the recurring units are recurring units (Rb) of formula (K)

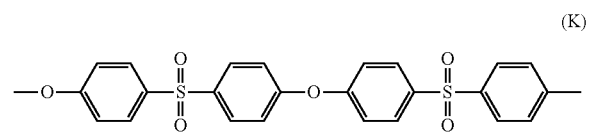

(K)

Preferably more than 75 wt. %, preferably more than 85 wt. %, preferably more than 95 wt. %, preferably more than 99 wt. % of the recurring units of the polyethersulfone are recurring units of formula (K). Most preferably all the recurring units of the polyethersulfone are recurring units of formula (K).

The polyethersulfone may be notably a homopolymer, or a copolymer such as a random or a block copolymer. When the polyethersulfone is a copolymer, its recurring units are advantageously a mix of recurring units (Rb) of formula (K) and of recurring units (Rb*), different from recurring units (Rb), such as recurring units of formula (L), (M) or (F) represented hereafter:

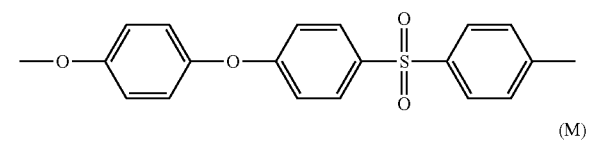

(L)

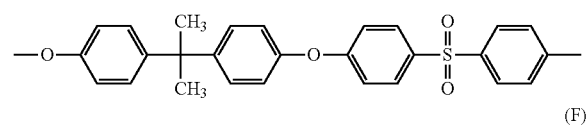

(M)

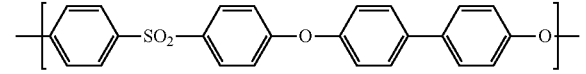

(F)

and mixtures thereof.

The polyethersulfone can also be a blend of the previously cited homopolymer and copolymer.

Polyethersulfone is notably available as VERADEL® PESU from Solvay Specialty Polymers USA, L.L.C.

Polyethersulfones can be prepared by known methods.

For the purpose of the present invention, a polyetherethersulfone is intended to denote any polymer of which more than 50 wt. % of the recurring units are recurring units (Rc) of formula (L)

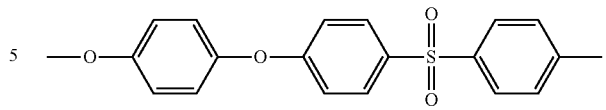

(L)

Preferably more than 75 wt. %, preferably more than 85 wt. %, preferably more than 95 wt. %, preferably more than 99 wt. % of the recurring units of the polyetherethersulfone are recurring units of formula (L). Most preferably all the recurring units of the polyetherethersulfone are recurring units of formula (L).

The polyetherethersulfone may be notably a homopolymer, or a copolymer such as a random or a block copolymer. When the polyetherethersulfone is a copolymer, its recurring units are advantageously a mix of recurring units (Rc) of formula (L) and of recurring units (Rc*), different from recurring units (Rc), such as recurring units of formula (K), (M) or (F) represented hereafter:

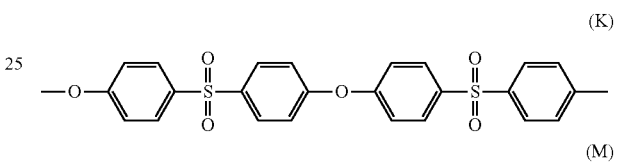

(K)

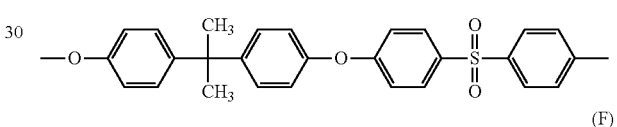

(M)

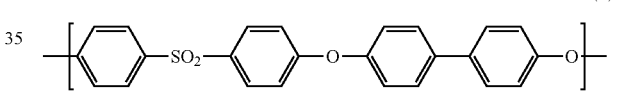

(F)

and mixtures thereof.

The polyetherethersulfone can also be a blend of the previously cited homopolymer and copolymer.

Polyetherethersulfones can be prepared by known methods.

For the purpose of the present invention, a bisphenol A polysulfone is intended to denote any polymer of which more than 50 wt. % of the recurring units are recurring units (Rd) of formula (M):

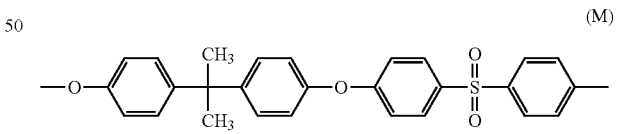

(M)

Preferably more than 75 wt. %, preferably more than 85 wt. %, preferably more than 95 wt. %, preferably more than 99 wt. % of the recurring units of the bisphenol A polysulfone are recurring units of formula (M). Most preferably all the recurring units of the bisphenol A polysulfone are recurring units of formula (M).

The bisphenol A polysulfone may be a homopolymer, or it may be a copolymer such as a random or a block copolymer. When the bisphenol A polysulfone is a copolymer, its recurring units are advantageously a mix of recurring units (Rd) and of recurring units (Rd*), different from recurring units (Rd), such as:

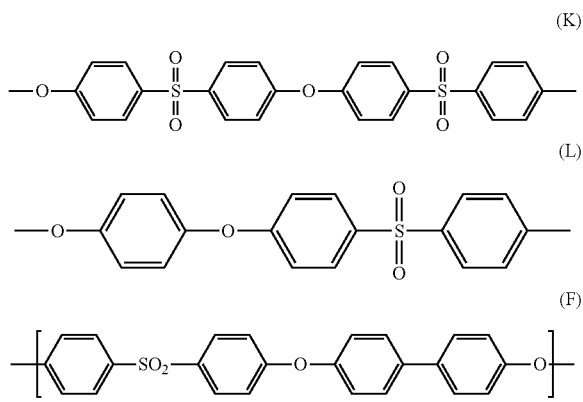

and mixtures thereof.

The bisphenol A polysulfones can also be a blend of the previously cited homopolymer and copolymer.

The bisphenol A polysulfones are notably available as UDEL® PSF from Solvay Specialty Polymers USA, L.L.C.

Bisphenol A polysulfones can be prepared by known methods.

According to a preferred embodiment of the invention, the (PAES) polymer is selected among poly(biphenylethersulfone)s comprising recurring units (Ra), as detailed above and preferably a PPSU, as detailed above.

As mentioned above, it is essential for the (PAES) polymer optionally present in the composition (C) to possess a melt flow of at least 15 g/10 min at 365° C. and under a load of 5.0 kg, as measured in accordance with ASTM method D1238; to measure said melt flow, a Tinius Olsen Extrusion Plastometer melt flow test apparatus can be used.

Upper boundary for the melt flow rate of the (PAES) polymer is not critical and will be selected by the skilled in the art as a matter of routine work. It is nevertheless understood that when the (PAES) polymer possibly comprised in the composition (C) possesses advantageously a melt flow rate of at most 120 g/10 min, at most 100 g/10 min, preferably at most 60 g/10 min, more preferably at most 50 g/10 min, still more preferably at most 40 g/10 min, when measured in accordance with ASTM method D1238 at 365° C. and under a load of 5.0 kg.

According to certain embodiments, the composition (C) will comprise a (PAES) polymer having a melt flow rate of 22 g/10 min or less, preferably of 20 g/10 min or less, even preferably of 18 g/10 min or less: in other words, the (PAES) polymer of this embodiment will have a melt flow rate, measured as above detailed, ranging from at least 15 g/10 min to 22 g/10 min or less, preferably ranging from at least 15 g/10 min to 20 g/10 min or less, even preferably ranging from at least 15 g/10 min to 18 g/10 min or less. RADEL® R PPSU is an example of a (PAES) polymer suitable for being used in this embodiment. Compositions (C) according to these embodiments are particularly well suited for delivering outstanding performances in films manufacture and wires coating at relatively high loads of (PAES) polymer, and consequently lower loads of (PTFE) polymers.

According to certain other embodiments, the composition (C) will comprise a (PAES) polymer having a melt flow rate of more than 22 g/10, preferably at least 25 g/10 min, even preferably at least 28 g/10 min. DURADEX® D-3000 PPSU is an example of a (PAES) polymer suitable for being used in this embodiment. Compositions (C) according to these embodiments are particularly well suited for delivering outstanding performances in films manufacture and wires coating at lower loads of (PAES) polymer, and consequently slightly higher loads of (PTFE) polymers.

As mentioned above, it is essential for the PPSU polymer optionally present in the composition (C) to possess a melt flow of at least 15 g/10 min at 365° C. and under a load of 5.0 kg, as measured in accordance with ASTM method D1238; to measure said melt flow, a Tinius Olsen Extrusion Plastometer melt flow test apparatus can be used.

Upper boundary for the melt flow rate of the PPSU polymer is not critical and will be selected by the skilled in the art as a matter of routine work. It is nevertheless understood that when the PPSU polymer possibly comprised in the composition (C) possesses advantageously a melt flow rate of at most 120 g/10 min, at most 100 g/10 min, preferably at most 60 g/10 min, more preferably at most 50 g/10 min, still more preferably at most 40 g/10 min, when measured in accordance with ASTM method D1238 at 365° C. and under a load of 5.0 kg.

According to certain embodiments, the composition (C) will comprise a PPSU polymer having a melt flow rate of 22 g/10 min or less, preferably of 20 g/10 min or less, even preferably of 18 g/10 min or less: in other words, the PPSU polymer of this embodiment will have a melt flow rate, measured as above detailed, ranging from at least 15 g/10 min to 22 g/10 min or less, preferably ranging from at least 15 g/10 min to 20 g/10 min or less, even preferably ranging from at least 15 g/10 min to 18 g/10 min or less. RADEL® R PPSU is an example of a PPSU polymer suitable for being used in this embodiment. Compositions (C) according to these embodiments are particularly well suited for delivering outstanding performances in films manufacture and wires coating at relatively high loads of PPSU polymer, and consequently lower loads of (PTFE) polymers.

According to certain other embodiments, the composition (C) will comprise a PPSU polymer having a melt flow rate of more than 22 g/10, preferably at least 25 g/10 min, even preferably at least 28 g/10 min. DURADEX® D-3000 PPSU is an example of a PPSU polymer suitable for being used in this embodiment. Compositions (C) according to these embodiments are particularly well suited for delivering outstanding performances in films manufacture and wires coating at lower loads of PPSU polymer, and consequently slightly higher loads of (PTFE) polymers.

When the composition (C) comprises the (PAES) polymer, as detailed above, then the combined weight of the polymer ($PAEK_{HMF}$) and the (PAES) polymer, based on the total weight of the polymer composition (C), is generally of at least 10 wt. %, preferably of at least 20 wt. %, more preferably of at least 30 wt. %, more preferably of at least 40 wt. %, most preferably of at least 50 wt. %, based on the total weight of the composition (C).

When present in the polymer composition (C), the weight of the (PAES) polymer, based on the total weight of the polymer composition (C), is preferably equal to or below 50%, more preferably equal to or below 45%, more preferably equal to or below 40%, even more preferably equal to or below 35%.

Good results were obtained when the composition (C) comprised the (PAES) polymer in an amount of 15 wt. % to 35 wt. %, based on the total weight of the polymer composition (C).

When present in the polymer composition (C), the weight of the (PAES) polymer, based on the total weight of the polymer ($PAEK_{HMF}$) and the (PAES) polymer, is generally of at most 60%, preferably of at most 50%, more preferably of at most 40%, by weight.

Besides, when present in the polymer composition (C), the weight of the (PAES) polymer, based on the total weight of the (PAEK$_{HMF}$) polymer and the (PAES) polymer, can be notably of at least 1%, at least 2% or at least 5%, by weight. It is preferably of at least 10%, more preferably of at least 15%.

The composition (C) of the present invention may optionally comprise a reinforcing filler.

A large selection of reinforcing fillers may be added to the composition (C). They are preferably selected from fibrous and particulate fillers. A fibrous reinforcing filler is considered herein to be a material having length, width and thickness, wherein the average length is significantly larger than both the width and thickness. Generally, such a material has an aspect ratio, defined as the average ratio between the length and the largest of the width and thickness of at least 5. Preferably, the aspect ratio of the reinforcing fibers is at least 10, more preferably at least 20, still more preferably at least 50.

Preferably, the reinforcing filler is selected from mineral fillers, such as notably talc, mica, titanium dioxide, kaolin, calcium carbonate, calcium silicate, magnesium carbonate); glass fiber; carbon fibers such as notably graphitic carbon fibers (some of them having possibly a graphite content of above 99%), amorphous carbon fibers, pitch-based carbon fibers (some of them having possibly a graphite content of above 99%), PAN-based carbon fibers; synthetic polymeric fiber; aramid fiber; aluminum fiber; aluminum silicate fibers; oxide of metals of such aluminum fibers; titanium fiber; magnesium fiber; boron carbide fibers; rock wool fiber; steel fiber; asbestos; wollastonite; silicon carbide fibers; boron fibers, boron nitride, graphene, carbon nanotubes (CNT) and the like.

It is understood that the skilled person will easily recognize the reinforcing filler which fits best its composition and encompassed end uses. Generally, the reinforcing filler is chosen depending on its chemical nature, its length, diameter, ability to feed nicely in compounding equipment without bridging and surface treatment (notably because good interfacial adhesion between the reinforcing filler and the polymer improves the stiffness and the toughness of the blend.

In one embodiment, the filler is chosen from fibrous fillers.

In other embodiment, the fillers are non-fibrous.

Glass fibers are silica-based glass compounds that contain several metal oxides which can be tailored to create different types of glass. The main oxide is silica in the form of silica sand; the other oxides such as calcium, sodium and aluminium are incorporated to reduce the melting temperature and impede crystallization. Glass fibers may have a round cross-section or a non-circular cross-section (so called "flat glass fibers"), including oval, elliptical or rectangular. The glass fibers may be added as endless fibers or as chopped glass fibers. The glass fibers have generally an equivalent diameter of 5 to 20 preferably of 5 to 15 µm and more preferably of 5 to 10 µm. All glass fiber types, such as A, C, D, E, M, S, R, T glass fibers (as described in chapter 5.2.3, pages 43-48 of *Additives for Plastics Handbook*, 2nd ed, John Murphy), or any mixtures thereof or mixtures thereof may be used. For example, R, S and T glass fibers are high modulus glass fibers that have typically an elastic modulus of at least 76, preferably at least 78, more preferably at least 80, and most preferably at least 82 GPa as measured according to ASTM D2343.

E, R, S and T glass fibers are well known in the art. They are notably described in Fiberglass and Glass Technology, Wallenberger, Frederick T.; Bingham, Paul A. (Eds.), 2010, XIV. R, S and T glass fibers are composed essentially of oxides of silicon, aluminium and magnesium. In particular, those glass fibers comprise typically from 62-75 wt. % of $SiO_2$, from 16-28 wt. % of $Al_2O_3$ and from 5-14 wt. % of MgO. To the contrary of the regular E-glass fibers widely used in polymer compositions, R, S and T glass fibers comprise less than 10 wt. % of CaO.

The fibrous filler, in particular the glass fiber, has a diameter preferably below 40 µm, more preferably, its diameter is below 20 µm, and still more preferably below 15 µm. On the other hand, the diameter of the fibrous filler, in particular the glass fiber, is preferably above 5 µm.

The fibrous filler, in particular the glass fiber, has a length preferably of below 20 mm, more preferably below 10 mm. Besides, it has a length of preferably above 1 mm, more preferably above 2 mm.

Preferably, the fibrous filler, in particular the glass fiber, is formulated with a high temperature sizing. The Applicant observed that said high temperature sizing provided superior interfacial adhesion with polymers that require generally to be processed at high temperatures, like PEEK, PEKK and PPSU.

Especially well-suited reinforcing fillers are VETROTEX® grade SGVA 910 chopped fiberglass from VETROTEX SAINT-GOBAIN and equivalents thereof.

In one specific embodiment, the reinforcing filler in the polymer composition (C) is a carbon fiber.

For the purpose of the present invention, the term "carbon fiber" is intended to include graphitized, partially graphitized and ungraphitized carbon reinforcing fibers or a mixture thereof.

For the purpose of the present invention, the term "fiber" means a fundamental form of solid (often crystalline) characterized by relative high tenacity and a high ratio of length to diameter.

The term "graphitized" intends to denote carbon fibers obtained by high temperature pyrolysis (over 2000° C.) of carbon fibers, wherein the carbon atoms place in a way similar to the graphite structure.

Carbon fibers useful for the present invention can advantageously be obtained by heat treatment and pyrolysis of different polymer precursors such as, for example, rayon, polyacrylonitrile (PAN), aromatic polyamide or phenolic resin; carbon fibers useful for the present invention may also be obtained from pitchy materials.

Carbon fibers useful for the present invention are preferably chosen from the group composed of PAN-based carbon fibers (PAN-CF), pitch based carbon fibers, graphitized pitch-based carbon fibers, and mixtures thereof.

PAN-based carbon fibers (PAN-CF) have advantageously a diameter of between 5 to 20 µm, preferably from 7 to 15 µm, more preferably from 8 to 12 µm, most preferably from 6 to 8 µm. Good results were obtained with PAN-based carbon fibers (PAN-CF) having a diameter of 7 µm.

The PAN-CF maybe of any length. In general, the length of PAN-CF is at least 50 µm.

The PAN-CF has advantageously a length in the compound (C) from 1 µm to 1 cm, preferably from 1 µm to 1 mm, more preferably from 5 µm to 500 µm and still more preferably from 50 to 150 µm.

The PAN-CF has advantageously a length to diameter ratio of at least 2, preferably of at least 5, more preferably of at least 7.

The PAN-CF has advantageously a length to diameter ratio of 2 to 30, preferably a ratio of 5 to 25, more preferably a ratio of 7 to 20. Good results were obtained with PAN-based carbon fibers (PAN-CF) having a ratio of 14.

Graphitized pitch-based carbon fibers are readily available from commercial sources containing at least about 50% weight graphitic carbon, greater than about 75% weight graphitic carbon, and up to substantially 100% graphitic carbon. Highly graphitic carbon fiber particularly suitable for use in the practice of this invention may be further characterized as highly conductive, and such fiber is generally used having a modulus of about 80 to about 120 million pounds per square inch, i.e., million lbs/in$^2$ (MSI). In certain embodiments the highly graphitic carbon fiber has a modulus of about 85 to about 120 MSI, and in other certain embodiments about 100 to about 115 MSI.

The pitch-based-CF has advantageously a diameter between 5 to 20 µm, preferably from 7 to 15 µm, more preferably from 8 to 12 µm.

The pitch-based-CF may be of any length. The pitch-based-CF has advantageously a length from 1 µm to 1 cm, preferably from 1 µm to 1 mm, more preferably from 5 µm to 500 µm and still more preferably from 50 to 150 µm.

The pitch-based-CF has advantageously a length to diameter ratio of at least 0.1, preferably of at least 3.0, more preferably of at least 10.0.

The pitch-based-CF has advantageously a length to diameter ratio of 0.1 to 30.0, preferably a ratio of 3 to 20, more preferably a ratio of 10 to 15.

Carbon fiber may be employed as chopped carbon fiber or in a particulate form such as may be obtained by chopping or comminuting the fiber. Comminuted graphitized pitch-based carbon fiber suitable for use in the practice of the invention may be obtained from commercial sources including from Cytec Carbon Fibers as ThermalGraph DKD X and CKD X grades of pitch-based carbon fiber and Mitsubishi Carbon Fibers as Dialead carbon fibers. Chopped PAN-based carbon fibers preferably used in the present invention may be obtained from commercial sources.

When the reinforcing filler is present in the polymer composition (C), the at least one reinforcing filler is present in an amount of advantageously at least 5 wt. %, preferably at least 10 wt. %, more preferably at least 15 wt. %, based on the total weight of the polymer composition (C).

The reinforcing filler is also present in an amount of advantageously at most 50 wt. %, preferably at most 45 wt. %, more preferably at most 40 wt. %, still more preferably at most 30 wt. %, based on the total weight of the polymer composition (C).

Other Ingredients

The polymer composition (C) may further optionally comprise other ingredients such as a colorant such as notably a dye and/or a pigment, ultraviolet light stabilizers, heat stabilizers, antioxidants, an acid scavenger, processing aids, nucleating agents, an internal lubricant and/or an external lubricant, flame retardants, a smoke-suppressing agent, an anti-static agent, an anti-blocking agent, and/or conductivity additive such as carbon black and carbon nanofibrils.

The polymer composition (C) may also further comprise other polymers different from the (PAEK$_{HMF}$) polymer and the (PAES) polymer, as detailed above. In particular, the polymer composition (C) may further comprise polymers such as polyetherimide, polyphenylsulfide and/or polycarbonate. Their addition can be useful notably when the film (F) or the wire coating to be manufactured there from must meet certain particular requirements, as needed by certain special end uses.

When one or more other ingredients are present, their total weight, based on the total weight of polymer composition (C), is usually below 50%, preferably below 20%, more preferably below 10% and even more preferably below 5%.

The composition (C) of the invention is preferably consisting essentially of the (PAEK$_{HMF}$) polymer, as detailed above, the (PTFE) polymer, as detailed above, optionally, the (PAES) polymer, as detailed above, optionally, the reinforcing filler, as detailed above, and optionally, other ingredients (I), as detailed above.

For the purpose of the present invention, the expression "consisting essentially of" are intended to denote that any additional ingredient different from the (PAEK$_{HMF}$) polymer, as detailed above, the (PAES) polymer, as detailed above, the (PTFE) polymer, as detailed above, optionally, the reinforcing filler, as detailed above, and optionally, other ingredients (I), as detailed above is present in an amount of at most 1% by weight, based on the total weight of the composition (C).

In one preferred embodiment, the composition (C) of the invention comprises, preferably consists essentially of:
- from 50 to 90% by weight (wt. %) of at least one (PEEK$_{HMF}$) polymer, as detailed above, having a melt flow rate (MFR) from 30 g/10 min to 55 g/10 min at 400° C. and under a load of 2.16 kg, as measured in accordance with ASTM method D1238.
- from 10 to 50% by weight (wt. %) of at least one (PTFE) polymer, as detailed above, having a D50 particle size from 3 µm to 6 µm, and having a melt viscosity from 100 to 1×10$^4$ Pa·s at 372° C. measured according to a modified ASTM D-1238-52T method and wherein all % are based on the total weight of the composition (C).

In another preferred embodiment, the composition (C) of the invention comprises, preferably consists essentially of:
- from 50 to 70% by weight (wt. %) of at least one (PEEK$_{HMF}$), as detailed above, polymer having a melt flow rate (MFR) from 30 g/10 min to 55 g/10 min at 400° C. and under a load of 2.16 kg, as measured in accordance with ASTM method D1238
- from 10 to 30% by weight (wt. %) of at least one (PTFE) polymer, as detailed above, having a D50 particle size from 3 µm to 6 µm, and having a melt viscosity from 100 to 1×10$^4$ Pa·s at 372° C. measured according to a modified ASTM D-1238-52T method
- from 15 to 35% by weight (wt. %) of at least one PPSU polymer, as detailed above, having a melt flow of at least 22 g/10 min at 365° C. and under a load of 5.0 kg, as measured in accordance with ASTM method D1238
- from 0 to 30% by weight (wt. %) of at least one reinforcing filler, as detailed above, and wherein all % are based on the total weight of the composition (C).

The composition (C) of the present invention has advantageously a melt flow rate (MFR) equal to or higher than 20 g/10 min at 400° C. and under a load of 2.16 kg, as measured in accordance with ASTM method D1238, preferably MFR is equal to or higher than 30 g/10 min, more preferably MFR is equal to or higher than 40 g/10 min.

The melt flow rate (MFR) of the composition (C) at 400° C. and under a load of 2.16 kg, as measured in accordance with ASTM method D1238, is generally of at most 120 g/10 min, preferably of at most 100 g/10 min, more preferably of at most 80 g/10 min, still more preferably of at most 60 g/10 min, even still more preferably of at most 50 g/10 min.

Good results have been obtained with a composition (C) having a melt flow rate (MFR) at 400° C. and under a load of 2.16 kg, as measured in accordance with ASTM method D1238 from 30 g/10 min to 50 g/10 min.

The composition (C) can be prepared by a variety of methods involving intimate admixing of the polymer materials with any optional ingredient, as detailed above, desired in the formulation, for example by melt mixing or a combination of dry blending and melt mixing. Typically, the dry blending of the (PAEK$_{HMF}$) polymer, the (PTFE) polymer, optionally the (PAES) polymer, optionally the reinforcing filler and all other optional ingredients, as above details, is carried out by using high intensity mixers, such as notably Henschel-type mixers and ribbon mixers.

So obtained powder mixture can comprise the (PAEK$_{HMF}$) polymer, the (PTFE) polymer, optionally the (PAES) polymer, optionally the reinforcing filler and all other optional ingredients in the weight ratios as above detailed, suitable for obtaining effective formation of thin films and wire coatings, or can be a concentrated mixture to be used as masterbatch and diluted in further amounts of the (PAEK$_{HMF}$) polymer, the (PTFE) polymer, optionally the (PAES) polymer, optionally the reinforcing filler and all other optional ingredients in subsequent processing steps.

It is also possible to manufacture the composition of the invention by further melt compounding the powder mixture as above described. As said, melt compounding can be effected on the powder mixture as above detailed, or preferably directly on the (PAEK$_{HMF}$) polymer, the (PTFE) polymer, optionally the (PAES) polymer, optionally the reinforcing filler and all other optional ingredients. Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

If desired, the design of the compounding screw, e.g. flight pitch and width, clearance, length as well as operating conditions will be advantageously chosen so that sufficient heat and mechanical energy is provided to advantageously fully melt the powder mixture or the ingredients as above detailed and advantageously obtain a homogeneous distribution of the different ingredients. Provided that optimum mixing is achieved between the bulk polymer and filler contents. It is advantageously possible to obtain strand extrudates which are not ductile of the composition (C) of the invention. Such strand extrudates can be chopped by means e.g. of a rotating cutting knife after some cooling time on a conveyer with water spray. Thus, for example composition (C) which may be present in the form of pellets or beads can then be further used for the manufacture of thin films and wire coatings.

Films (F)

Still another objet of the invention is a method for manufacturing a film [film (F), herein below] comprising using the composition (C), as above detailed.

The Applicant has surprisingly found that the composition (C), as described above, is effective in providing films (F) having a reduced tendency to tearing and/or forming holes during melt manufacturing and/or having improved surface appearance (e.g. having a lower amount of surface defects) and/or having an increased smoothness.

Techniques for manufacturing films are well known in the art. The composition (C) of the invention will be preferably processed under the form of a film by cast extrusion or hot blown extrusion techniques, optionally with mono- or bi-axial orientation.

A technique particularly adapted to the manufacture of films (F) of the composition (C) of the invention involve extruding the molten composition (C) through a die having elongated shape so as to obtain an extruded tape and casting/calendering said extruded tape so as to obtain a film. Tape can be calendered into a film by passing through appropriate rolls, which can be maintained at appropriate temperatures, and whose speed can be adjusted so as to achieve the required thickness.

In one embodiment of the present invention, the molten composition (C) existing the die has advantageously a temperature of at least 300° C., preferably of at least 320° C., and still more preferably of at least 340° C. The molten composition (C) existing the die has advantageously a temperature of at most 430° C., preferably of at most 400° C., more preferably of at most 380° C. and still more preferably of at most 360° C.

For the purpose of the present invention, the term "film (F)" possesses its usual meaning and is generally understood to encompass substantially bi-dimensional sheets having thickness substantially lower than width and length.

The thickness of film (F) is preferably equal to or below 200 μm, preferably equal to or below 100 μm, still more preferably equal to or below 75 μm, and even more preferably equal to or below 75 μm. The thickness of said film is typically equal to or at least 50 μm, preferably equal to or at least 20 μm, more preferably equal to or at least 30 μm. It is understood that when the film (F) has a thickness below this lower limit, it is sometimes prone to tearing and hole formation.

Good results were obtained when the film (F) of the present invention has a thickness of about 50 μm.

For the purpose of the present invention, the thickness (t) of the film (F) can be defined as:

$$t = \int^V \tau(x,y,z) dx\, dy\, dz/V,$$

wherein x, y and z are the coordinates in a three-dimensional space of an elementary volume dV (dV being equal to dx times dy times dz) of the film of overall plain volume V, and τ is the local thickness. The local thickness τ, associated to a material point of coordinates (x,y,z), can be defined as the length of the shortest straight line D including the material point of concern, which goes right through the film (i.e. which goes from the material point where D enters the film to the material point where D exits the film). In general, the local thickness τ is substantially constant over the whole film (F), i.e. each material point of the film (F) has substantially the same thickness. Preferably, the local thickness τ is essentially constant or perfectly constant over the whole film (F), i.e. respectively, each material point of the film (F) has essentially the same or has exactly the same thickness.

Films obtained from using composition (C) as above detailed are preferably homogenous films, i.e. films having advantageously a total rugosity of equal to or below 80 μinch, preferably equal to or below 50 μinch, more preferably equal to or below 10 μinch, most preferably below 6 μinch.

For the purpose of the present invention, the term "rugosity" is intended to be a measurement of the surface roughness of the film (F) of the present invention. The rugosity has been determined using a Profilometer, by laying the films on a flat surface and placing a thickness probe on different points of the film to measure thickness using the respective equipment, for example, MarSurf GD25 from the company Mahr. Films so obtained are another object of the present invention.

Thus another aspect of the present invention is a film (F) comprising the composition (C), as detailed above. Preferably, the film (F) or part of the film (F) consists of the composition (C), as detailed above.

Wire Coatings (W)

Still another object of the invention is a method of manufacturing a wire coating [wire coating (W), herein below] comprising using the composition (C), as above detailed, wherein the amount of the (PTFE) polymer is less than 40 wt. %, preferably equal to or less than 35 wt. %, most preferably equal to or less than 30 wt. %, based on the total weight of the composition (C).

Techniques for manufacturing wire coatings are well known in the art. The composition (C) can be applied to the wire by any suitable method such as notably by extrusion coating around a wire to form a wire coating, such as notably disclosed in U.S. Pat. No. 4,588,546. Extrusion coating process is particularly preferred.

The Applicant has surprisingly found that when the composition (C), as mentioned above, comprises an amount of (PTFE) polymer of less than 40 wt. %, preferably equal to or less than 35 wt. %, most preferably equal to or less than 30 wt. %, based on the total weight of the composition (C), said composition (C) is particularly effective in providing thin PAEK-based wire coatings, having a reduced tendency to tearing and/or surface fracturing during coating extrusion.

Conventional coating extrusion devices, such as notably a coating extruder equipped with a screw, crosshead, breaker plate, distributor, nipple, and die can be used. If desired different types of dies can be used in the extrusion coating process, such as notably a single taper die, a double taper die, sizing die, other appropriate die or combination of dies to position the wire centrally and avoid die lip build up.

In some embodiments of the invention, it may be useful to dry the composition (C) before extrusion coating, for example drying of the composition (C), as detailed above, can be carried out at 60 to 110° C. and for about 2 to 20 hours.

In one preferred embodiment of the present invention, in the extrusion coating process, the composition (C) of the present invention is melt filtered, prior to formation of the coating, through one or more filters.

If desired, the wire being coated is preheated to a temperature between of about 175° C. to about 400° C., preferably from 200 to 350° C., more preferably from 275 to 325° C. It is important for this preheating of the wire to be done at a stage that will allow it to remain hot for the subsequent extrusion of the composition (C) onto and around it.

In general, the extruder temperature during the extrusion coating process is generally less than the degradation temperature of the ($PAEK_{HMF}$) polymer, as detailed above and optionally, the (PAES) polymer. Additionally the processing temperature is adjusted to provide a sufficiently fluid molten composition (C) to afford coating the wire, for example, higher than the softening point of the composition (C), or more specifically at least 30° C. higher than the melting point of the composition (C).

If desired, after the extrusion coating process, the coated wire can be cooled in a water bath such as notably a water bath having temperatures of about 20 to 85° C., water spray, air jets or a combination comprising one or more of the foregoing cooling methods. However, in a preferred embodiment, the coated wire is not cooled. The choice of the wire is not critical and any wire can be coated; the wire may be metal wire selected from copper wire, aluminum wire, lead wire, and wires of alloys comprising one or more of the foregoing metals.

The wire coating (W) has generally a thickness equal to or below 200 µm, preferably equal to or below 100 µm, more preferably equal to or below 75 µm, and still more preferably equal to or below 75 µm. The thickness of said wire coating is typically equal to or at least 50 µm, preferably equal to or at least 20 µm, more preferably equal to or at least 30 µm. It is understood that when the wire coating has a thickness below this lower limit, it is sometimes prone to tearing and hole formation.

Good results were obtained when the wire coating of the present invention has a thickness of about 50 µm.

It is understood that the thickness (t) of the wire coating (W) can be defined in the same way as the thickness (t) of the film (F), as described above.

It is understood that thickness of the wire coating may vary and is typically determined by the end use of the coated wire.

Typical end uses, without limitation, include for harness wire for automobiles, wire for household electrical appliances, wire for electric power, wire for instruments, wire for information communication, magnet wire for electric motors, wire for electric cars, as well as ships, airplanes, and the like.

Wire coatings (W) and the coated wires so obtained are other objects of the present invention.

Thus another aspect of the present invention is a wire coating or coated wire comprising the composition (C), as detailed above, with the proviso that the poly(tetrafluoroethylene) (PTFE) polymer of the present invention as detailed above is present in an amount of less than 40 wt. %, preferably in an amount of equal to or less than 35 wt. %, most preferably in an amount of equal to or less than 30 wt. %, based on the total weight of the composition (C). Preferably, the wire coating or at least part of the wire coating consists of the composition (C), as detailed above.

Should the disclosure of any patents, patent applications, and publications which are incorporated herein by reference conflict with the description of the present application to the extent that it may render a term unclear, the present description shall take precedence.

EXAMPLES

The invention will be now described in more details with reference to the following examples, whose purpose is merely illustrative and not intended to limit the scope of the invention.

Raw Materials

KETASPIRE® KT-880 [MFR (400° C./2.16 kg) is 39.5 g/10 min; MV (400° C., 1000 $s^{-1}$) is 0.15 kPa·s; IV is 0.75 dl/g-0.77 dl/g] and KETASPIRE® KT-820 [MFR (400° C./2.16 kg) is 6 g/10 min; MV (400° C., 1000 $s^{-1}$) is 0.41 kPa·s;] are aromatic polyetheretherketone (PEEK) polymers commercially available from Solvay Specialty Polymers USA, LLC.

RADEL® R 5100 PPSU [MFR (400° C./2.16 kg) is 17.2 g/10 min] and DURADEX® D-3000 [MFR (400° C./2.16 kg) is 30.2 g/10 min] are polyphenylsulfone (PPSU) homopolymers from Solvay Specialty Polymers USA, L.L.C.

PTFE: Polymist® XPP-511 is a polytetrafluoroethylene powdered resin, obtained from SOLVAY SPECIALTY POLYMERS ITALY S.p.A. having a D50 particle size of 20 µm, a melting point $T_{m(II)}$ of 329° C. The melt viscosity (MV) is equal to or lower than $1 \times 10^5$ Pa·s at 372° C. measured according to a modified ASTM D1238-52T method PTFE: Polymist® F5-A is a polytetrafluoroethylene powdered resin, obtained from SOLVAY SPECIALTY POLYMERS ITALY S.p.A. having a D50 particle size of 4 µm, a melting point $T_{m(II)}$ of 326° C. The melt viscosity (MV) is equal to or lower than $1 \times 10^5$ Pa·s at 372° C. measured according to a modified ASTM D1238-52T method The Following Characterizations Carried out on the Materials of the Examples are Indicated Hereinafter:

Melt Flow Rate (MFR)

The melt flow rate (MFR) of the (PTFE) polymer was measured at 372° C. and under a load of 10 kg and the MFR of the PEEK polymer at 400° C. and under a load of 2.16 kg, both in accordance with ASTM method D1238.

The melt flow rate (MFR) of the PPSU polymers was measured at 365° C. and under a load of 5 kg, in accordance with ASTM method D1238.

The melt flow rate (MFR) of the polymer compositions was measured at 400° C. and under a load of 2.16 kg, both in accordance with ASTM method D1238.

Viscosity Measurements

The melt viscosity (MV) of the (PTFE) polymer is measured at 372° C. in accordance with the procedure ASTM D-1238-52T modified as notably described in U.S. Pat. No. 4,380,618. The cylinder, orifice and piston tip are made of a corrosion-resistant alloy, Haynes Stellite 19, made by Haynes Stellite Co. The 5.0 g sample is charged to the 9.53 mm (0.375 inch) inside diameter cylinder, which is maintained at 372° C. Five minutes after the sample is charged to the cylinder, it is extruded through a 2.10 mm (0.0825 inch) diameter, 8.00 mm (0.315 inch) long square-edge orifice under a load (piston plus weight) of 5000 grams. This corresponds to a shear stress of 44.8 KPa (6.5 pounds per square inch). The melt viscosity in poises is calculated as 53170 divided by the observed extrusion rate in grams per minute.

Melt viscosity (MV) measurements of PEEK polymers were made with a capillary rheometer according to ASTM D3835. Readings were taken at 400° C. using a die with the following characteristics: diameter: 1.016 mm, length: 20.32 mm, cone angle 120° and a shear rate of 1000 $s^{-1}$.

The viscosity of a melt of KETASPIRE® KT-880 PEEK polymers was also measured as a function of shear rate at several temperatures using an LCR-7000 Capillary Rheometer and using a die with the following characteristics: diameter: 1.016 mm, length: 20.32 mm, cone angle 120°, as shown in Table 1 below:

TABLE 1

| Shear Rate (1/s) | Visc. (kPa · s) at 400° C. |
|---|---|
| 100.2 | 0.225 |
| 400.9 | 0.187 |
| 1002.3 | 0.154 |
| 2505.7 | 0.121 |
| 5011.5 | 0.960 |
| 7015.9 | 0.850 |
| 10022.8 | 0.710 |

Reduced viscosity (RV) of the PEEK polymers were measured in 95-98% sulfuric acid (d=1.84 g/ml) at a polymer concentration of 1 g/100 ml at 25° C. using a Cannon-Fenske viscometer tube (No. 50) according to ASTM D2857.

Intrinsic viscosity (IV) of the PEEK polymers were measured in 95-98% sulfuric acid (d=1.84 g/ml) at a polymer concentration of 0.1 g/100 ml at 25° C. using a Cannon-Fenske viscometer tube (No. 50) according to ASTM D2857.

The Second Melting Temperature ($T_{m(II)}$ Melting Point)

The second melting temperature was measured according to the ASTM D3418 method which has been modified in such a way that the heating and cooling steps are carried out as shown in Table 2 below:

TABLE 2

| Step # | |
|---|---|
| 1 | Heat to 250° C. at 50° C./minute |
| 2 | Heat from 250° C. to 380° C. at 10° C./minute |
| 3 | Hold for 2 minutes |
| 4 | Cool from 380° C. to 250° C. at 10° C./minute |
| 5 | Hold for 2 minutes |
| 6 | Heat from 250° C. to 380° C. at 10° C./minute |
| 7 | Hold for 2 minutes |
| 8 | Cool down |

The melting point observed at the second heating period was recorded and is hereby referred to as the melting point of the (PTFE) polymer ($T_{m(II)}$).

General Description of the Compounding Process of the Polymer Compositions

All polymer compositions (PEEK/PTFE polymer compositions shown in Tables 4 and PEEK/PPSU/PTFE polymer compositions shown in Table 5) were produced by melt compounding on a Berstorff A, 25-mm twin screw co-rotating intermeshing extruder having an L/D ratio of 40 using compounding conditions as shown in Table 3.

TABLE 3

| | Set Point (° C.) |
|---|---|
| Barrel 2 | 330 |
| Barrel 3 | 330 |
| Barrel 4 | 330 |
| Barrel 5 | 340 |
| Barrel 6 | 340 |
| Barrel 7 | 340 |
| Barrel 8 | 340 |
| Adapter | 340 |
| Die | 340 |
| Screw Speed (RPM) | 210 |
| Torque (Amps) | 7 |
| Feed Rate (lb/hr) | 20 |

The mechanical properties of the polymer compositions prepared were tested according to ASTM standards. For the preparation of the test specimen, in particular tensile and flex bars, and 4×4×⅛ inch plaques, the polymer compositions were molded on the Toshiba-150 injection molder according to the conditions as shown in Table 4.

TABLE 4

Tensile and flex bars, and 4 × 4 × ⅛ inch plaques were made with the following conditions:

| ISO bars | | 4 × 4 × ⅛" plaques | |
|---|---|---|---|
| | Temp ° C. | | Temp ° C. |
| Zone 1 | 380 | Zone 1 | 375 |
| Zone 2 | 390 | Zone 2 | 375 |
| Zone 3 | — | Zone 3 | 365 |
| Zone 4 | 385 | Nozzle temp. | 365 |
| Zone 5 | 380 | | |
| Mold temp. | 195 | Mold temp. | 195 |
| Cycle time | 44 sec | Cycle time | 46 sec |
| Fill time | 1.5 sec | Fill time | 8 sec |
| Plast. time | 16 sec | Charge time | 12 sec |
| Hold time 1 | 6 sec | Hold time 1 | 6 sec |
| Hold time 2 | 15 sec | Cooling time | 12 sec |
| Cooling time | 16 sec | Back pressure | 4% |
| Hold pressure 1 | 10% | Inj. pressure | 400 psi |
| Hold pressure 2 | 12% | | |

The various ASTM employed were the following:
Flexural Strength and Modulus, Tensile Strength and Modulus: D638
Notched Izod Impact: D256.

The mechanical properties are summarized in Tables 5, 6 and 7.

TABLE 5

|  | KETASPIRE ® KT-880 PEEK polymer[a] | | | | | KETASPIRE ® KT-820 PEEK polymer[a] | | | | |
|---|---|---|---|---|---|---|---|---|---|---|
|  | Examples N° | | | | | | | | | |
|  | 1 | 2 | 3 | 4 | 5 | C6 | C7 | C8 | C9 | C10 |
| Polymist ® F5-A PTFE (wt. %)[a] | 10 | 20 | 30 | 40 | 50 | 10 | 20 | 30 | 40 | 50 |
| Polymer composition (C) properties | | | | | | | | | | |
| MFR [400° C./2.16 kg] (g/10 min) | 43.8 | 44.25 | 49 | — | — | — | — | — | — | — |
| Flexural Strength (psi) | 21010 | 19291 | 17470 | 16362 | 14970 | — | 16789 | — | — | — |
| Flexural Modulus (psi) | 546746 | 518637 | 482441 | 461356 | 430059 | — | 480290 | — | — | — |
| Tensile Strength (psi) | 13500 | 12000 | 10400 | 9310 | 8360 | — | 10600 | — | — | — |
| Tensile Modulus (psi) | 529000 | 497000 | 475000 | 437000 | 414000 | — | 472000 | — | — | — |
| Notched Izod Impact (ft-lb/in) | 1.81 | 1.53 | 1.5 | 1.34 | — | — | — | — | — | — |
| Film properties | | | | | | | | | | |
| Film Quality[b]/ Wire Coating Quality[c] | Good/ Good | Good/ Good | Good/ Good | Good/ Poor | Good/ Poor | Poor/ Poor | Poor/ Poor | Poor/ Poor | Poor/ Poor | Poor/ Poor |

|  | Examples N° | | | | | | | | | |
|---|---|---|---|---|---|---|---|---|---|---|
|  | C11 | C12 | C13 | C14 | C15 | C16 | C17 | C18 | C19 | C20 |
| Polymist ® XPP-511 PTFE (wt. %)[a] | 10 | 20 | 30 | 40 | 50 | 10 | 20 | 30 | 40 | 50 |
| Polymer composition (C) properties | | | | | | | | | | |
| Flexural Strength (psi) | — | 18062 | 15559 | 13377 | — | — | — | 14102 | 12070 | 1000 |
| Flexural Modulus (psi) | — | 487000 | 435000 | 39200 | — | — | — | 384000 | 350000 | 323000 |
| Tensile Strength (psi) | — | 11500 | 9940 | 8450 | — | — | — | 9320 | 7800 | 6370 |
| Tensile Modulus (psi) | — | 472000 | 424000 | 378000 | — | — | — | 388000 | 340000 | 319000 |
| Film properties | | | | | | | | | | |
| Film Quality[a]/ Wire Coating Quality[b] | Poor/ Poor | Poor/ Poor | Poor/ Poor | Poor/ Poor | Poor/ Poor | Poor/ Poor | Poor/ Poor | Poor/ Poor | Poor/ Poor | Poor/ Poor |

[a]The wt % of the PEEK polymer is the residual weight for giving a total weight of 100%
[b]Extruded 50 μm thick film having a poor quality refers to films having a lot of tears and voids; a excellent quality refers to film having no tears and looking visually homogeneous
[c]50 μm thick wire coatings having a poor quality refers to wire coatings having a lot of tears and voids; an excellent quality refers to wire coatings having no tears and looking visually homogeneous

TABLE 6

|  | KETASPIRE ® KT-880 PEEK polymer[a] | | | | |  | KETASPIRE ® KT-880 PEEK polymer[a] | | |
|---|---|---|---|---|---|---|---|---|---|
| Examples N° | 22 | 23 | 24 | C25 | C26 | Examples No | 27 | 28 | C29 |
| Polymist ® F5-A PTFE (wt. %) | 10 | 20 | 30 | 40 | 50 | Polymist ® F5-A PTFE (wt. %) | 10 | 20 | 30 |
| DURADEX ® FD-3000 PPSU | 22.5 | 20 | 17.5 | 15 | 12.5 | RADEL ® R 5100 PPSU | 33.5 | 29.5 | 26 |
| Polymer composition (C) properties | | | | | | Polymer composition (C) properties | | | |
| Flexural Strength (psi) | — | 16800 | 15400 | — | — | Flexural Strength (psi) | 14690 | 12558 | |
| Flexural Modulus (psi) | — | 455000 | 429000 | — | — | Flexural Modulus (psi) | 384459 | 344422 | |
| Tensile Strength (psi) | — | 11000 | 9650 | — | — | Tensile Strength (psi) | 10100 | 8140 | |
| Tensile Modulus (psi) | — | 446000 | 419000 | — | — | Tensile Modulus (psi) | 372000 | 297000 | |
| Notched Izod Impact (ft-lb/in) | — | 1.59 | 1.36 | — | — | Notched Izod Impact (ft-lb/in) | — | — | — |
| Film properties | | | | | | Film properties | | | |
| Film Quality[a]/ Wire Coating Quality[b] | Good/ Good | Good/ Good | Good/ Good | Poor/ Poor | Poor/ Poor | Film Quality[a]/ Wire Coating Quality[b] | Good/ Good | Good/ Good | Poor/ Poor |
| Examples N° | C30 | | C40 | | C50 | Examples N° | C51 | C52 | C53 |
| Polymist ® XPP-511 PTFE (wt. %) | 10 | | 20 | | 30 | Polymist ® XPP-511 PTFE (wt. %) | 10 | 20 | 30 |
| DURADEX ® D-3000 PPSU | 22.5 | | 20 | | 17.5 | RADEL ® R 5100 PPSU | 33.5 | 29.5 | 26 |

TABLE 6-continued

| Polymer composition (C) properties | KETASPIRE ® KT-880 PEEK polymer[a] | | | Polymer composition (C) properties | KETASPIRE ® KT-880 PEEK polymer[a] | | |
|---|---|---|---|---|---|---|---|
| Flexural Strength (psi) | | | 12994 | Flexural Strength (psi) | | 14690 | 12558 |
| Flexural Modulus (psi) | | | 359182 | Flexural Modulus (psi) | | 384459 | 344422 |
| Tensile Strength (psi) | | | 8370 | Tensile Strength (psi) | | 10100 | 8140 |
| Tensile Modulus (psi) | | | 328000 | Tensile Modulus (psi) | | 372000 | 297000 |
| Film properties | | | | Film properties | | | |
| Film Quality[b]/ Wire Coating Quality[c] | Poor/ Poor | Poor/ Poor | Poor/ Poor | Film Quality[b]/ Wire Coating Quality[c] | Poor/ Poor | Poor/ Poor | Poor/ Poor |

[a]The wt % of the PEEK polymer is the residual weight for giving a total weight of 100%
[b]Extruded 50 μm thick film having a poor quality refers to films having a lot of tears and voids; a excellent quality refers to film having no tears and looking visually homogeneous
[c]50 μm thick wire coatings having a poor quality refers to wire coatings having a lot of tears and voids; an excellent quality refers to wire coatings having no tears and looking visually homogeneous

TABLE 7

| | KETASPIRE ® KT-820 PEEK polymer[a] | | |
|---|---|---|---|
| Examples No | C54 | C55 | C56 |
| Polymist ® F5-A PTFE (wt. %) | 10 | 20 | 30 |
| RADEL ® R 5100 PPSU | 33.5 | 29.5 | 26 |
| Polymer composition (C) properties | | | |
| Flexural Strength (psi) | | 17038 | |
| Flexural Modulus (psi) | | 446138 | |
| Tensile Strength (psi) | | 11000 | |
| Tensile Modulus (psi) | | 427000 | |
| Notched Izod Impact (ft-lb/in) | | 2.13 | |
| Film properties | | | |
| Film Quality[a]/ Wire Coating Quality[b] | Poor/ Poor | Poor/ Poor | Poor/ Poor |
| Examples No | C57 | C58 | C59 |
| Polymist ® XPP-511 PTFE (wt. %) | 10 | 20 | 30 |
| RADEL ® R 5100 PPSU | 33.5 | 29.5 | 26 |
| Polymer composition (C) properties | | | |
| Flexural Strength (psi) | | 16248 | |
| Flexural Modulus (psi) | | 437616 | |
| Tensile Strength (psi) | | 11000 | |
| Tensile Modulus (psi) | | 425000 | |
| Film properties | | | |
| Film Quality[b]/ Wire Coating Quality[c] | Poor/ Poor | Poor/ Poor | Poor/ Poor |

[a]The wt % of the PEEK polymer is the residual weight for giving a total weight of 100%
[b]Extruded 50 μm thick film having a poor quality refers to films having a lot of tears and voids; a excellent quality refers to film having no tears and looking visually homogeneous
[c]50 μm thick wire coatings having a poor quality refers to wire coatings having a lot of tears and voids; an excellent quality refers to wire coatings having no tears and looking visually homogeneous Manufacturing of Films Films were prepared from all the polymer compositions (Tables 5, 6 and 7). All film extrusions were carried out on a 0.75 inch Brabender lab scale film line including a single screw extruder with a 0.75 inch general purpose (GP) screw having an L/D of 25. No mixing section and no screen pack were used. Details of the extrusion conditions can be found in Table 8:

TABLE 8

| | Set Point |
|---|---|
| Zone #1 | Temp = 330° C. |
| Zone #2 | Temp = 340° C. |
| Zone #3 | Temp = 350° C. |
| Film Die | Temp = 360° C. |
| Screw RPM | 60 to 80 rpm |
| Line Speed | Set Point 4 (no units on the line) |
| Finished thickness | 0.050 mm target |
| Roll Temperature | 90° C. (set point) |

The film die used was a 125 mm wide, non-coated, flex lip film die and the material channel inside the die was an industry standard "coathanger" design. Die gap was set to approximately 0.015 inch and the distance from the die face to roll stack was approximately 12 to 19 mm. The roll stack was a 3 roll, up stack configuration. Nip gap between the bottom and middle roll was controlled by spring tensioners. The roll stack temperature was set to 90° C. The heating unit had difficulty in maintaining this temperature so the actual roll temp varied between 80° C. and 95° C.

The film was thus run in an up-stack configuration while utilizing a 3 roll cooling stack. Slight variations were done on screw speed and zone and die temperature setting to optimize the process for some of the different materials, however these adjustments were within 5% of the above set-points.

The film obtained had a thickness of approximately 50 μm and a film width of 115 mm. The surface roughness (rugosity) and mechanical properties of the films made from example 3 and comparative examples C8 and C13 (see table 5) were measured and the results are summarized in Table 9.

The rugosity was determined using a Profilometer. The films were tightened to a flat surface and a thickness probe was placed on different points of the film to measure thickness using the respective equipment, MarSurf GD25 from the company Mahr. The average of these points were calculated and reported as Rugosity.

TABLE 9

| | Film made | | |
|---|---|---|---|
| | Film made from sample No 3 | Film made from sample No C8 | Film made from sample No C13 |
| Examples No | 57 | C58 | C59 |
| Rugosity (μinch) | 5.6 | 87 | 181.4 |
| Tensile Strength at Break (psi) | 10123 | 7656 | |
| Tensile Strength at Yield (psi) | 7356 | 5436 | 548 |
| Tensile Modulus (psi) | 212 | 174 | 59 |
| Elongation at Break (%) | 197 | 163 | 9 |
| Elongation at Yield (%) | 7.4 | 5.6 | 6.3 |

Manufacturing of Wire Coatings

Wire coatings were prepared from all the polymer compositions (Tables 5, 6 and 7). All wire coatings were carried out on a 1.5 inch Entwhistle with a general purpose (GP) screw having an L/D of 24, using a 80:100:80 mesh screen pack to improve back-pressure in the screw. There were no mixing sections on the screw. The conductor diameter was 0.080 inch, the conductor material was Copper. The Die was 0.268 inch and the tip was 0.225" (flush). The wire line was set up with a standard payout reel, resistive pre-heating station, tubing type cross head connected to the single screw extruder. Down stream equipment included a cooling trough, in-line wire diameter gage, and a take-up reel.

Details of the wire coating conditions can be found in Table 10:

TABLE 10

|  | Set Point (Temp. ° C.) |
| --- | --- |
| Zone #1 | 327 |
| Zone #2 | 338 |
| Zone #3 | 349 |
| Zone #4 | 360 |
| Flange #1 | 355 |
| Flange #2 | 355 |
| Neck | 371 |
| Head | 371 |
| Die #1 | 371 |
| Die #2 | 371 |
| Melt Temp | 360 |
| Screw RPM | 15 rpm |
| Line Speed | 36.5 m/min (120 ft/min) |
| Finished Diameter | 0.855 inch |
| Pre-Heat | Utilized torch |

To allow for the crystallization of the polymers, the trial was conducted without cooling water in the down line cooling troughs. A small amount of air was blown onto the wire at the end of the cooling troughs at approximately 0.6 meters from the cross head. The wire conductor (copper wire) was preheated utilizing a propane torch since the on-line resistance heater was not functional. The conductor temperature was around 95° C. The wire was manufactured on a tubing-type cross head. A slight, in measurable, amount of vacuum was applied to ensure optimum draw down of the polymer on to the wire. The coated wire was pulled through rollers and collected on a wire-wheel at a rate of 36.5 m/min with the extruder running at 15 rpm. The thickness of the total coating and wire was measured through an imbedded laser measuring device. The thickness of the naked wire was then subtracted from the total thickness to determine coating thickness. A coated wire with a 50 μm thickness was obtained.

The invention claimed is:

1. A composition (C) comprising:
   from 0.1 to 99.9 % by weight (wt. %) of at least one poly(aryl ether ketone) polymer, ($PAEK_{HMF}$) polymer, having a melt flow rate (MFR) equal to or higher than 8 g/10 min at 400° C. and under a load of 2.16 kg, as measured in accordance with ASTM method D1238;
   from 0.1 to 50 wt. % of at least one poly(tetrafluoroethylene) polymer, (PTFE) polymer, having a D50 particle size equal to or below 10 μm measured by laser scattering technique, and having a melt viscosity equal to or lower than $1\times10^5$ Pa·s at 372° C. measured according to a modified ASTM D-1238-52T method;
   from 0 to 50% wt. % of at least one poly(aryl ether sulfone) polymer, (PAES) polymer, having a melt flow of at least 15 g/10 min at 365° C. and under a load of 5.0 kg, as measured in accordance with ASTM method D1238; and
   from 0 to 50 % wt. % of at least one reinforcing filler,
   with the proviso that:
   should the composition (C) comprise a (PAES) polymer having a melt flow of more than 22 g/10 min, when measured in accordance with ASTM method D1238 at 365° C. and under a load of 5.0 kg, then the (PTFE) polymer is present in an amount of less than 40 wt. %, and
   should the composition (C) comprise a (PAES) polymer having a melt flow of 22 g/10 min or less, when measured in accordance with ASTM method D1238 at 365° C. and under a load of 5.0 kg, then the (PTFE) polymer is present in an amount of less than 30 wt. %, wherein all % are based on the total weight of the composition (C).

2. The composition (C) according to claim 1, wherein more than 50% moles of recurring units of the ($PAEK_{HMF}$) polymer are recurring units ($R_{PAEK\_HMF}$) selected from the group consisting of formulae (J-A) to (J-O):

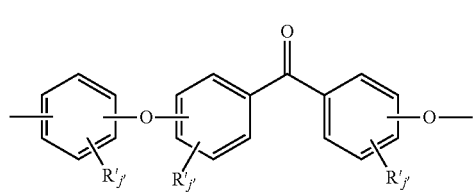
(J-A)

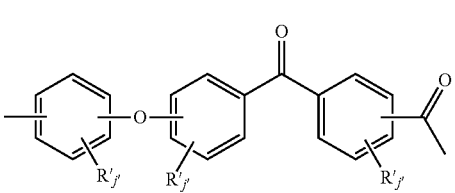
(J-B)

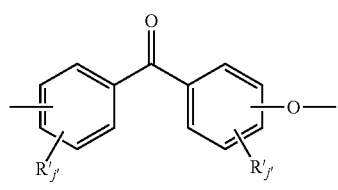
(J-C)

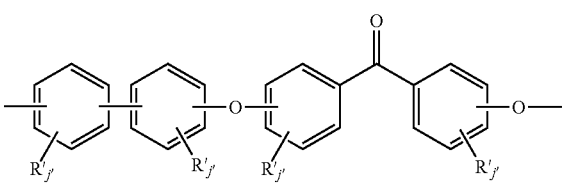
(J-D)

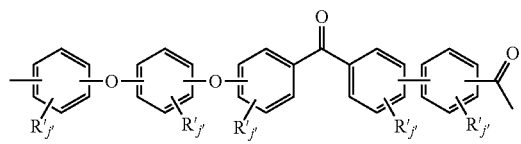
(J-E)

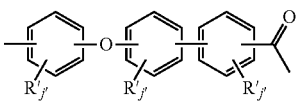
(J-F)

(J-G)
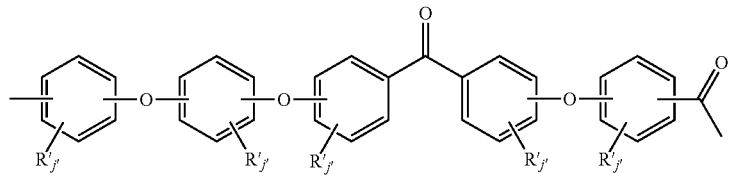
(J-H)
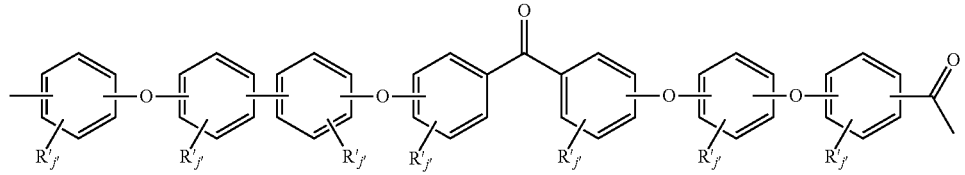
(J-I)
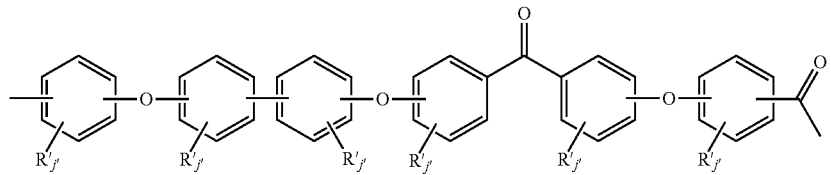
(J-J)
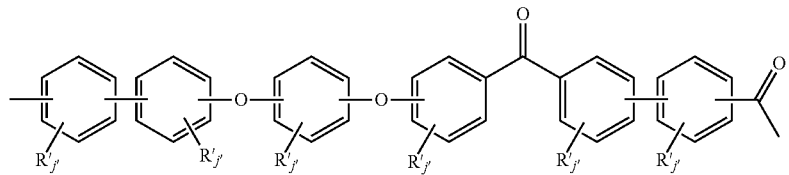
(J-K)
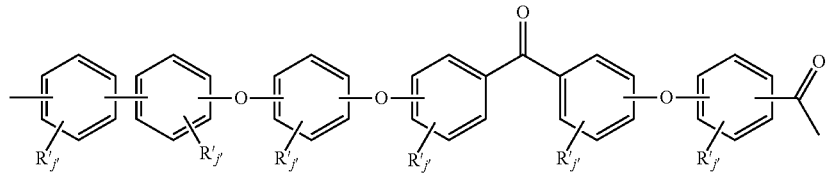
(J-L)
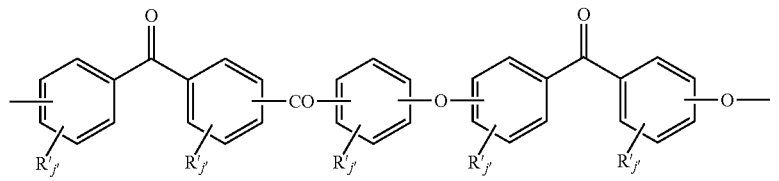
(J-M)
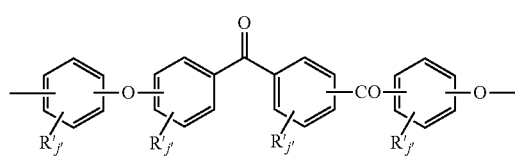
(J-N)
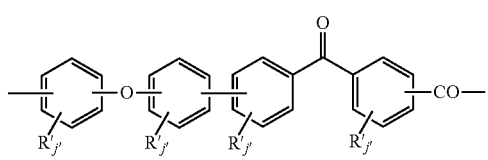
(J-O)
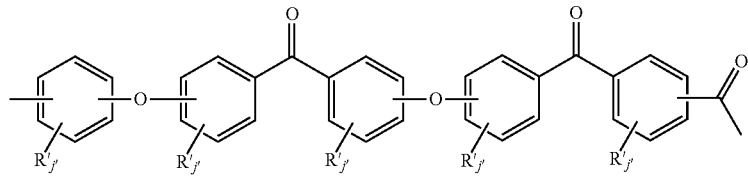

wherein:

each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j' is zero or is an integer from 0 to 4.

T and T', equal to or different from each other and at each occurrence, is independently a bond or a divalent group optionally comprising one or more than one heteroatom; and n and m, equal to or different from each other, are independently zero or an integer of 1 to 5.

9. The composition (C) according to claim 1, wherein the (PAES) polymer is a poly(biphenyl ether sulfone) comprising more than 50 wt. % of recurring units (Ra) selected from the group consisting of those of formulae (F), (H) and (J)

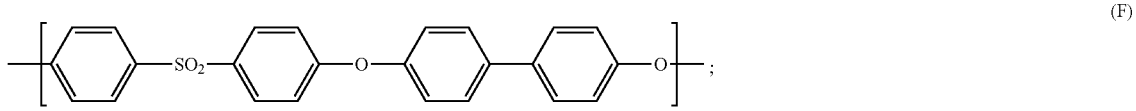

(F)

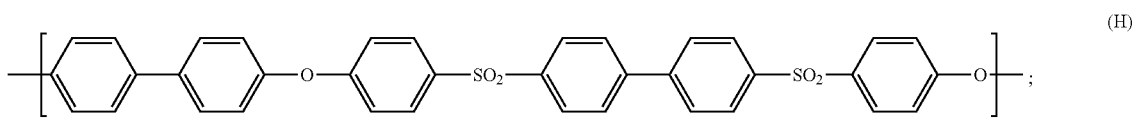

(H)

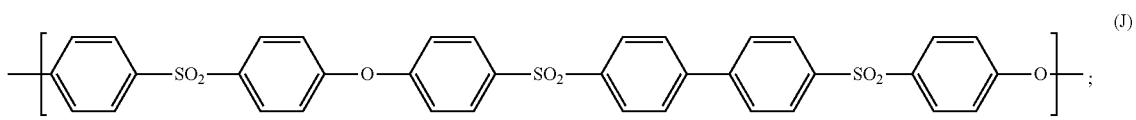

(J)

3. The composition (C) according to claim 1 comprising from 40 to 90 wt. % of the (PAEK$_{HMF}$) polymer, based on a total weight of the composition (C), with the proviso that (PAES) polymer is absent.

4. The composition (C) according to claim 1 comprising from 40 to 70 wt. % of the (PAEK$_{HMF}$) polymer, based on a total weight of the composition (C), with the proviso that (PAES) polymer is present.

5. The composition (C) according to claim 1, wherein the melt flow rate (MFR) of the (PAEK$_{HMF}$) polymer is from 30 g/10 min to 55 g/10 min at 400° C. and under a load of 2.16 kg, as measured in accordance with ASTM method D1238.

6. The composition (C) according to claim 1, wherein the (PTFE) polymer has a D50 particle size from 2 μm to 8 μm measured by laser scattering technique.

7. The composition (C) according to claim 1 comprising from 15 to 35 wt. % of the (PAES) polymer, based on the total weight of the composition (C).

8. The composition (C) according to claim 1, wherein more than 50% moles of recurring units of the (PAES) polymer are recurring units (R) of formula (A) as shown below:

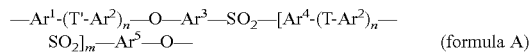

(formula A)

wherein:

Ar$^1$, Ar$^2$, Ar$^3$, Ar$^4$, and Ar$^5$, equal to or different from each occurrence, are independently an aromatic mono- or polynuclear group;

and mixtures thereof.

10. The composition (C) according to claim 1, wherein the composition further comprises a reinforcing filler in an amount of at most 50 wt. % and other ingredients in an amount below 50 wt. %, and wherein all % are based on the total weight of the composition (C).

11. A method for manufacturing a film (F) comprising the composition (C) of claim 1, wherein the composition (C) is processed under the form of a film by cast extrusion or hot blown extrusion techniques.

12. The method of claim 11, wherein the film (F) has a mono- or bi-axial orientation.

13. The method of claim 11 comprising extruding the composition (C) in molten form through a die having an elongated shape to obtain an extruded tape, and casting and/or calendering the extruded tape to form the film (F).

14. A film (F) comprising the composition (C) of claim 1, wherein the film (F) has a thickness equal to or below 200 μm, and a total rugosity of equal to or below 80 μinch.

15. A method for manufacturing a wire coating (W) comprising the composition (C) of claim 1, wherein the amount of the (PTFE) polymer is less than 40 wt. %, and the method is an extrusion wire coating process.

16. A wire coating (W) or coated wire comprising the composition (C) of claim 1, wherein the amount of the (PTFE) polymer is less than 40% wt.

17. The wire coating (W) or coated wire according to claim 16, wherein the wire coating (W) has a thickness equal to or below to or below 200 μm.

* * * * *